(12) United States Patent
Harbin

(10) Patent No.: US 8,677,918 B2
(45) Date of Patent: *Mar. 25, 2014

(54) MARINE VESSEL HAVING REDUCED SKIN FRICTION DRAG

(76) Inventor: Lawrence Harbin, Alexandria, VA (US)

( * ) Notice: Subject to any disclaimer, the term of this patent is extended or adjusted under 35 U.S.C. 154(b) by 53 days.

This patent is subject to a terminal disclaimer.

(21) Appl. No.: 12/929,398

(22) Filed: Jan. 21, 2011

(65) Prior Publication Data

US 2012/0204780 A1    Aug. 16, 2012

Related U.S. Application Data

(63) Continuation-in-part of application No. 12/318,879, filed on Jan. 12, 2009, now Pat. No. 8,196,536, and a continuation-in-part of application No. 12/318,880, filed on Jan. 12, 2009, now Pat. No. 8,201,511.

(60) Provisional application No. 61/006,388, filed on Jan. 10, 2008, provisional application No. 61/282,394, filed on Feb. 2, 2010.

(51) Int. Cl.
*B63B 1/38* (2006.01)

(52) U.S. Cl.
USPC ........................................ 114/67 A

(58) Field of Classification Search
USPC .............................. 114/67 A, 67 R
See application file for complete search history.

(56) References Cited

U.S. PATENT DOCUMENTS

| | | | |
|---|---|---|---|
| 3,763,810 A | * | 10/1973 | Payne ............................ 114/285 |
| 4,429,652 A | | 2/1984 | Stol |
| 4,825,795 A | | 5/1989 | Slemmons |
| 5,117,882 A | | 6/1992 | Stanford |
| 5,452,676 A | | 9/1995 | Fiore |
| 5,524,568 A | | 6/1996 | Bobst |
| 5,613,456 A | | 3/1997 | Kuklinski |

(Continued)

OTHER PUBLICATIONS

Skin Friction Reduction by Microbubbles, Kato Hirohara, Tokyo University, Japan, Dec. 1999.

(Continued)

*Primary Examiner* — Stephen Avila
(74) *Attorney, Agent, or Firm* — Harbin & Hein PLLC

(57) ABSTRACT

A marine vessel comprising a hull having a wetted area when underway on a surface of a body of water, a series of spaced transducer sections positioned in the wetted area of the hull, and an acoustic generator to energize the transducers to produce acoustic waves having an intensity sufficient to nucleate cavitation upon cavitation nuclei suspended in the water medium. Suspended cavitation nuclei include entrained gases, particulate matter, microbubbles formed from windblown breaking waves, and/or phase-boundaries at gas-water or solid-water interfaces in the water medium. The intensity, duty cycle and/or frequency of the acoustic waves are determined and/or regulated according to water conditions to produce microcavitation bubbles in the boundary layer between fifty and two hundred microns in size or to optimally reduce drag. An operator or controller may dynamically regulate the frequency, intensity, and/or duty cycle of acoustic waves according to vessel speed and/or sea surface conditions.

29 Claims, 16 Drawing Sheets

(56) References Cited

U.S. PATENT DOCUMENTS

| | | | |
|---|---|---|---|
| 5,895,997 | A | 4/1999 | Puskas |
| 6,186,085 | B1 | 2/2001 | Kato |
| 6,356,816 | B1 * | 3/2002 | Katz .............................. 701/21 |
| 2001/0022152 | A1 | 9/2001 | Takahashi |
| 2002/0108631 | A1 * | 8/2002 | Madanshetty ................... 134/1 |
| 2004/0016699 | A1 * | 1/2004 | Bayevsky .................... 210/636 |
| 2006/0061225 | A1 * | 3/2006 | Beck et al. .................... 310/120 |
| 2008/0276960 | A1 | 11/2008 | Holsteyns |
| 2009/0318813 | A1 * | 12/2009 | Thompson et al. ........... 600/459 |
| 2011/0233143 | A1 * | 9/2011 | McGuire et al. ......... 210/748.02 |

OTHER PUBLICATIONS

Skin Friction Reduction by Introduction of Microbubbles Into Turbulent Boundary Layer, Mohanarangam et Dec. 2007.

Drag Reduction by Microbubbles in a Spatially Developing Turbulent Boundary Layer, Ferrante, et al., Spring 2006.

Cloud Cavitation Control Using Vortex Generators Hailing An, Purdue University, Jul. 2005.

Pp. 9-10, Drag Reduction Technologies, V.T. Truong, Maritime Platforms Division, Aeronautical & Maritime Res. Lab. Jun. 2001.

ASME Conference Proceeding, Jul. 2006, Abstract.

\* cited by examiner

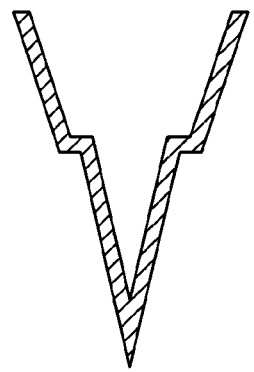
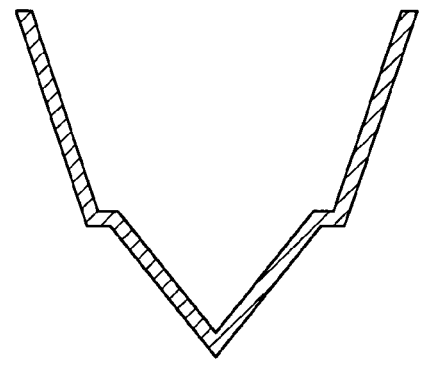
FIG. 5B    FIG. 5C
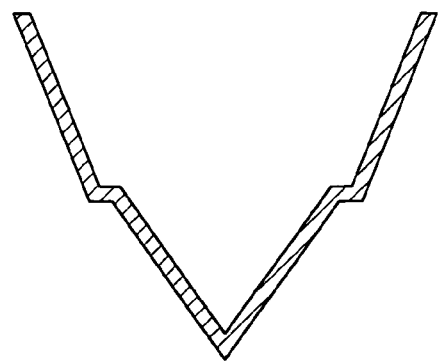
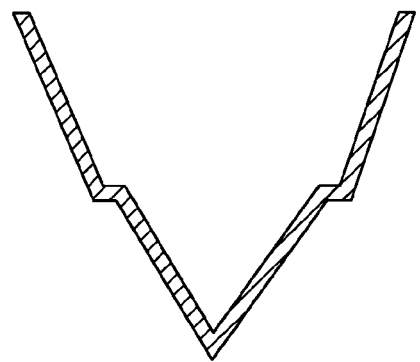
FIG. 5D    FIG. 5E

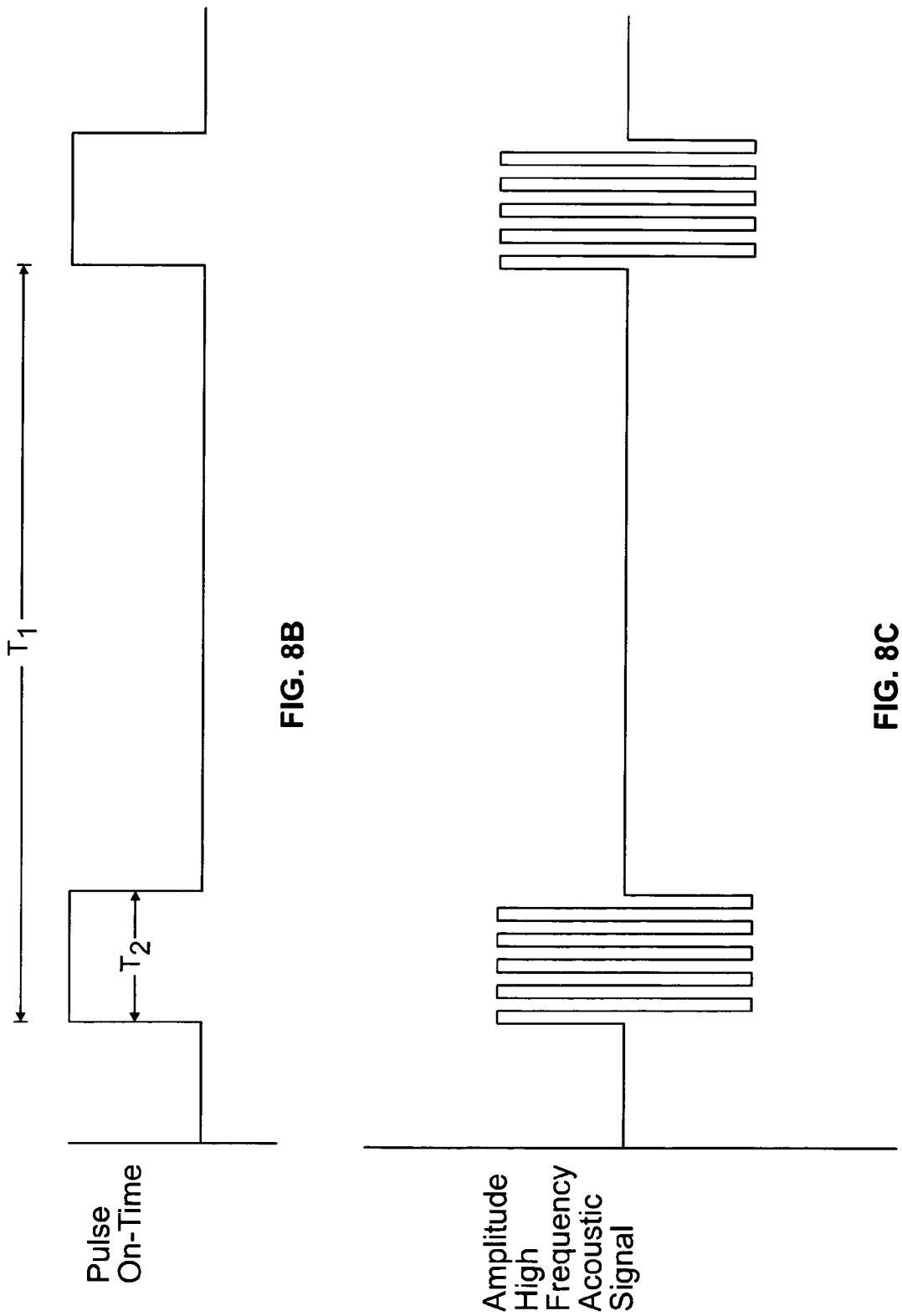

US 8,677,918 B2

MARINE VESSEL HAVING REDUCED SKIN FRICTION DRAG

CROSS-REFERENCE TO RELATED PATENTS AND PATENT APPLICATIONS

This application claims the benefit of U.S. Provisional Patent Application Ser. No. 61/282,394 filed Feb. 2, 2010 entitled Marine Vessel Having Reduced Skin Friction Drag.

This invention is a continuation-in-part of copending U.S. patent application Ser. No. 12/318,879 filed Jan. 12, 2009 entitled Apparatus To Reduce Skin Friction Drag on a Marine Vessel (now U.S. Pat. No. 8,196,536) and U.S. patent application Ser. No. 12/318,880 filed Jan. 12, 2009 entitled Method To Reduce Skin Friction Drag on a Marine Vessel (now U.S. Pat. No. 8,201,511), which are incorporated herein, each of which claims benefit of U.S. Provisional Application Ser. No. 61/006,388 filed Jan. 10, 2008.

BACKGROUND

This invention relates to a marine surface vessel, but more specifically, to a method and system to improve propulsive performance by reducing skin friction drag on a hull of a marine surface vessel while underway at sea.

As generally accepted in the marine science, resistance to ship propulsion due to hydrodynamic drag includes skin friction drag, wave drag, and form drag. The total hydrodynamic drag force opposing propulsion $F_{HD}=\frac{1}{2} \cdot C_R \rho \upsilon^2 A$, where $C_R$ is the coefficient of friction, $\rho$ is density of water, $\upsilon$ is the relative velocity between the vessel and the water, and A is the area of the wetted portion of the hull. In this relationship, the coefficient of resistance $C_R=C_{friction}+C_{wave}+C_{form}$. At higher speeds, drag from aerodynamic resistance also contributes to overall drag. Skin friction drag, however, results from water clinging to the hull due to its viscosity and is often the dominant element in the opposing drag force, particularly at high speeds, e.g., above thirty knots. This invention is directed to reducing skin friction drag, which may as well have beneficial impacts on other aspects of ship performance.

As the vessel moves through water, propulsive energy is needlessly expended by pulling an excess mass of water (e.g., momentum transfer) along with the submersed portion of the hull. This results from viscous interaction at a boundary layer between the hull and the surrounding water medium. Varying amounts of water is pulled along with the vessel according to whether the water flow against the hull is laminar or turbulent. Assuming the hull is clean and smooth (which is rarely the case), flow is generally laminar at a leading portion of the bow and, depending on the vessel's speed, becomes turbulent at some point aft of the bow along the bow-to-stern path. Surface texture greatly impacts whether flow is laminar or turbulent. Also, the turbulent flow region of the hull pulls along more water mass than the laminar flow region because turbulent flow reaches deeper into the surrounding bulk of the water medium to disturb more mass. In practice, flow along a hull at normal speeds is mostly turbulent and drag forces resulting from skin friction is directly related to the amount of water mass being pulled along with the vessel's movement through water. According to an aspect of this invention, viscous interaction between a marine hull and surrounding water is reduced by imparting cavitation or microcavitation bubbles in and about the boundary layer at the hull-water interface, which acts to separate the hull from the viscous mass of the water and to reduce momentum transfer to the bulk water medium.

Imparting micron-size air bubbles in the laminar and/or turbulent flow regions of the water immediately against the hull is known to reduce skin friction drag thereby improving the vessel's propulsive performance. In effect, microbubbles may be considered to alter the kinematic viscosity or the effective density and/or viscosity of the water. Drag reduction can be appreciated from the generally accepted hydrodynamic drag force equation $F_{HD}=\frac{1}{2} \cdot C_R \rho \upsilon^2 A$. If the water density $\rho$ decreases due to microcavitation, then so does the hydrodynamic drag force $F_{HD}$. In addition, such cavitation or microcavitation helps establish an air interface or partial air interface between the hull and the water thereby helping to reduce drag.

According to the present invention, cavitation or microcavitation is accomplished acoustically to effectively fracture the water medium to create, grow, and/or maintain gas pockets in the water medium at and/or within the boundary layer between the hull and the water. The present invention takes advantage of known techniques to acoustically produce and control microbubbles. The invention makes use of entrained air and particulate matter normally extant on the surface of sea, lake, and river water to facilitate nucleation, splitting and growth of microcavitation bubbles through the application of acoustic energy in a controlled fashion.

SUMMARY

In accordance with a first aspect of the invention, there is provided a marine vessel that travels on a surface of a body of water wherein the vessel comprises a hull having a wetted area when underway, a series of spaced insonification sections positioned near an aft region of the hull, an acoustic generator to power the insonification sections to produce acoustic waves having an intensity sufficient to nucleate cavitation upon cavitation nuclei suspended in the water, and a wiring harness to distribute power to the series of insonification sections.

Other aspect include wherein the series of insonification sections are contained within a sonification plate, and the sonification plate is affixed against said hull; wherein the sonification plate is filled with foam or other a water blocking material to prevent wetting of insonifying devices or circuitry thereof; wherein the insonification sections having a spacing in a fore-aft direction of travel, and the spacing is determined according to vessel operating speed, nature of said acoustic waves, and/or conditions of the water medium in terms of cavitation nuclei and threshold or other condition; wherein the series of insonification sections comprise a row of acoustic transducers extending abeam of a keel of said hull; wherein the acoustic generator produces a series of tone bursts of high-frequency acoustic energy; wherein the acoustic generator produces a tone burst of high-frequency acoustic energy having an initial high-frequency to initiate cavitation followed by a series of higher-frequency pulses to grow cavitation bubbles; wherein the acoustic generator includes a common power supply to transducer pairs substantially equidistant from and positioned on opposite sides of a keel line of said hull in order to maintain symmetric drag reduction in the event of a failure of one of the transducers of the transducer pair; wherein the acoustic generator is responsive to a wetted area sensor to active a given insonification section; wherein the hull is stepped, and the series of insonification sections are additionally provided in a wetted area fore of the step; wherein the hull is fiberglass and sonification sections are embedded in the fiberglass; wherein the vessel further includes a controller to regulate at least one of intensity and duty cycle of the acoustic generator according to surface conditions said water; wherein the vessel further includes a controller to regulate at least one of intensity, frequency, and duty cycle of the acoustic generator according to speed of the vessel; wherein the vessel further includes a controller to enable an operator to control at least one of intensity, frequency, and duty cycle of the acoustic generator; wherein the vessel further includes a controller to intermittently or alternately supply power to respective insonification sections whereby to enable greater portion of available acoustic power to be instantaneously supplied to a given insonification section; wherein the vessel further includes a wetness sensor to activate a given insonification section in response to a wetted condition thereof whereby to conserve power when portions of the hull become aerated during high-speed planing; wherein the hull comprising a planing hull having a reduce wetted area while on plane, and the series of acoustic transducers are positioned against the hull in the reduced wetted area; and/or wherein the acoustic generator produces an ultrasonic tone burst signal that imparts to the water an acoustic wave having a momentary intensity between 0.5 and 1000 watts per square centimeter.

In accordance with another aspect of the invention, there is provided a method of reducing skin friction drag of a marine hull while underway in surface contact with a water body, wherein the method comprises providing insonifying transducers on a wetted region of the hull; determining a cavitation threshold of water medium on which the hull travels; energizing the transducers to produce acoustic waves having an intensity to at least exceed a tensile strength of the water medium to nucleate cavitation on cavitation nuclei suspended in the medium whereby to populate microcavities therein; and during movement of said medium pass said insonifying transducers, exposing populated microcavities to tone bursts of acoustic waves having an intensity and frequency between eighteen and two hundred kilohertz in accordance with conditions of said water medium in order to grow said populated microcavities to a desired number, density, and/or size to achieve a desired drag reduction.

Other aspects of the method include wherein the target size of the microcavities produced in the exposing step ranges between fifty and two hundred microns; wherein the exposing step includes regulating a duty cycle of the tone bursts to produce a pattern of cavitation that optimally achieves a desired drag reduction; regulating the intensity and/or said duty cycle according to speed of the hull in relation to the water medium; regulating both intensity and duty cycle wherein the acoustic intensity ranges between 0.5 to 1000 watts per square centimeter and said duty cycle inversely ranges between 100% and 0.1%; providing a distributor/controller to distribute tone bursts of acoustic signals among multiple insonifying transducers affixed about the hull in order to produce microcavitation bubbles about a wetted area of the hull; alternately or periodically distributing tone bursts of acoustic signal among the insonifying transducers; dynamically determining the cavitation threshold while the hull is underway and adjusting the intensity according to the dynamically determined threshold; and/or wherein said providing step includes providing the transducers inside a watertight sonification plate having a diaphragm side and a abutment side, and mounting the abutment side of the sonification plate against a wetted region of the hull. The diaphragm side may be roughened to facilitate threshold reduction and microcavitation formation.

In yet another aspect of the invention, there is provided a marine vessel comprising a hull having a wetted area when underway on a surface of a body of water, a series of spaced transducer sections positioned in the wetted area, and an acoustic generator to energize the transducers to produce acoustic waves having an intensity determined according to conditions of said water that is sufficient to nucleate cavitation upon cavitation nuclei suspended in the water. Other features of this aspect include wherein the intensity and a frequency of the acoustic generator is determined to produce acoustic waves to achieve a target size of microcavitation bubbles that includes a size between fifty and two hundred microns; a controller to regulate a duty cycle of acoustic waves to produce a pattern of cavitation that optimally reduces drag; and/or a controller to regulate intensity and/or duty cycle of the acoustic waves according to vessel speed.

Other features and aspects of the invention will become apparent upon review of the following description taken in connection with the accompanying drawings. The invention, though, is pointed out with particularity by the appended claims.

BRIEF DESCRIPTION OF THE DRAWINGS

FIGS. 5B-5E respectively show cross-cuts along lines B-B, C-C, D-D, and E-E of FIG. 5A.

FIGS. 8B and 8C show the nature of the high-frequency acoustic tone burst signal applied to the transducers during the on-time indicated in FIG. 8B.

DESCRIPTION OF ILLUSTRATIVE EMBODIMENTS

Figure 1:
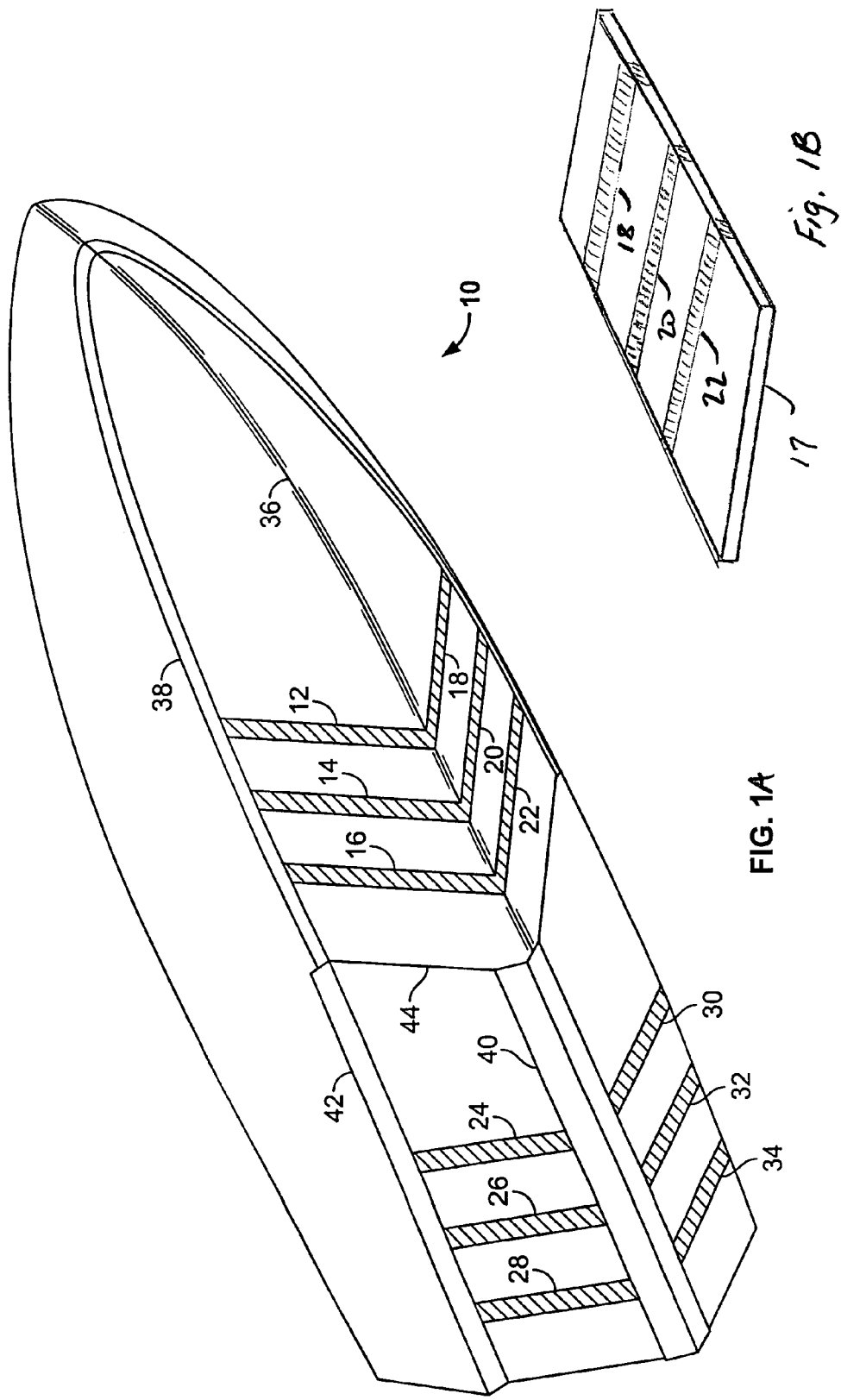
FIG. 1A is a perspective view of a hull bottom that includes insonification strips or transducer sections according to an aspect of the present invention. Spacing between strips may vary from zero (i.e., continuous section) and is determined for a desired quantity and nature of microbubbles (i.e., which determines drag reduction) against the hull for a given operating speed.
FIG. 1B shows a sonification plate in which transducers are mounted, which plate may be affixed to the hull of FIG. 1A to form the insonification strips.

FIG. 1 is bottom perspective view of an exemplary stepped marine hull 10 that includes a series of flush-mounted sonification generator strips 12-22 in a fore section and a series of aft flush-mounted sonification generator strips 24-34 located in an aft section of the hull in accordance with an aspect of the present invention. Without limiting the invention, the strips may measure ten to thirty centimeters in the fore-aft direction, more or less. In practice, such insonification strips or row of transducers may be mounted within an insonification plate (stainless steel) of FIG. 1B, which may be is contoured with the hull, which is then bolted to the hull of the vessel as provided in the above-identified related patent applications. This minimizes cavitation damage to the hull material between strips. The sonification plate 17 of FIG. 1B embodies rows of acoustic transducers to form the respective sonification generator strips 18-22, which are similarly depicted in FIG. 1A. Plate 17 has an abutment side that abuts against the hull and a diaphragm side that imparts acoustic waves to the water medium. The diaphragm side may be roughened or provided with surface discontinuities which, when co-acting with vessel speed and acoustic waves, provides additional cavitation nuclei or lowers cavitation threshold of the water medium. The diaphragm side may also be coated with a low friction enhancement material, such as Teflon or other material.

In the forward section of hull 10, the sonification strips extend from a keel line 36 generally outward to a chine 38 that runs fore and aft of hull 10. In the aft section of hull 10, the sonification (sound wave) generators extend from a keel pad 40 to chine 42. Pad keel 40 may also be equipped with sonification generators on the surface thereof. The sonification generators, when excited with acoustic energy, transmit acoustic waves that induce or nucleate transient and/or study-state microbubbles in a boundary layer between the hull skin and the liquid medium (e.g., seawater) in which the hull is immersed. To reduce skin friction drag, these boundary layer microbubbles operate to sever the viscous grip on the hull imposed by the liquid medium while the hull proceeds through water thereby reducing momentum transfer to the water medium.

Some microbubbles are nucleated on entrained gas (air) bubbles (microbubbles may also be populated by splitting larger microbubbles suspended in the medium), and other microbubbles may be nucleated on particulate matter or on liquid-gas or liquid-solid phase boundaries suspended in the water medium. Research has shown that bubbles sizes in the fifty to two hundred micron range, more or less, are generally effective to reduce skin friction drag and, according to the present invention, bubble size, density, and population may be controlled or maintained by regulating intensity, frequency, and duty cycle (on-off switching) of tone bursts of the acoustic signal in accordance with observed, known, anticipated, forecasted, or detected surface conditions of the water medium in order to achieve optimum drag reduction. Thus, in accordance with the present invention, control of parameters of the acoustic signal seeks to control microbubble size somewhere between twenty and two hundred microns, or between one and one thousand microns (whichever is more effective), and with a density and/or number to optimize drag reduction.

In the illustrated embodiment, only one chine on each side of the hull is shown although additional lifting chines may be included as known in the art. Lifting chines may also be insonified to assist the vessel in coming on plane.

The transducer assemblies or sonification generators are generally flush-mounted with hull 10 in order to avoid discontinuities in flow, which helps maintain cavitation bubbles generated by the sonification strips within the boundary layer. Bubbles grown by rectified diffusion (in which the bubble cavity during oscillation thereof absorbs surrounding gases that may be entrained in the water medium) remain within the bulk liquid until re-absorbed by the medium whereas transient vacuous bubbles generally disappear after removal of insonifying acoustic energy. A bubble grown by rectified diffusion tends to remain after removal of insonifying energy.

In addition, the sonification generator strips need only be mounted in a wetted section or region of the hull 10. Since the illustrated hull 10 is ventilated by step 44 and, when underway on plane, only a portion of the fore section and a portion of the aft section remain wetted. The region immediately aft of the step 44 is ventilated and the foremost region of hull 10 is aerated due to lifting of the hull when on plane. Although one step 44 is shown, hull 10 may include multiple steps or, the hull 10 may not have steps at all in which case the wetted area is larger thus requiring additional sonification sections to insonify the entire wetted region.

Moreover, the invention may be applied to hulls of any length or size, from a few meters to several hundred meters in length and even to vessels from a few tons to hundreds of tons in displacement. In addition to planing hulls (stepped or non-stepped), the invention may also be applied to displacement hull and semi-displacement hull vessels. The invention is particularly applicable to vessels having a hull speed exceeding thirty knots or where skin friction drag becomes prominent in relation to the vessel's form drag and wave drag.

Fore-aft spacing of the transducer generators strips in the direction of travel is arranged or determined according the nature and extent of acoustic energy applied to the sonification strips and the desired drag reduction and/or operating speed of the vessel. At higher speeds, e.g., sixty to eighty knots versus forty knots for example, higher acoustic energy and/or closer fore-aft spacing of sonification strips may be required in order to generate and/or maintain a sufficient number and size of microcavitation bubbles in the boundary layer as they are being swept way to a greater extent by laminar or turbulent flow along the hull. In situations where the cavitation threshold is low, for example, less acoustic energy is required to produce a desired quantity and nature of microbubbles. Thus, interrelated variables to determine the extent of spacing of the transducers or transducer sections (or even transducer size or individual power capacity) in the direction of travel include vessel speed, insonifying energy/waveform, and conditions of the water medium in terms of cavitation nuclei and threshold or other condition. The size and concentration of microcavitation bubbles depend on the nature and extent of excitation of insonifying transducers (e.g., intensity level, duty cycle, frequency, power spectrum, etc.) and the nature and quality of the seawater or other medium (lake or river), which impact the cavitation threshold (the point at which the liquid medium begins to fracture and form microbubbles). Sea water, for example, is reported to have a cavitation threshold of about 0.5 to 2.0 watts per square centimeter, more or less. This threshold could vary by an order of magnitude higher or lower depending on a number of parameters. These include water temperature, vapor pressure, amount entrained gases (e.g., air (nitrogen and oxygen), vapor, and carbon dioxide), salinity, as well as the amount and nature of dissolved minerals and particulate matter (organic and/or inorganic). Atmospheric conditions including wind speed, wave action (breaking waves), and barometric pressure, to certain extent, may also affect the cavitation threshold. These elements influence the ability of the imparted acoustic energy to nucleate cavitation in the liquid medium, to populate microbubbles from existing microbubbles (e.g., splitting), and/or to grow cavitation bubbles by rectified diffusion. Cavitation threshold of seawater typically is believed to range from about 0.3 to 1.0 watts per square centimeter, more or less, in accordance with the aforementioned factors.

At certain high speeds and energy/water conditions, the series of sonification strips may be merged together to form a continuous sonification plate, which acts as a diaphragm, as described in the related applications mentioned above.

Unlike the larger insonification plates shown in the incorporated related applications, a given bulk of liquid medium may not be subjected to prolonged insonification (i.e., multiple cycles of energy) due to reduced exposure time to insonifying energy when passing under a narrower strip. Therefore, in order to compensate for this reduced exposure time, a higher frequency and/or energy level is applied in the insonification strips. Instead of eighteen to forty kilohertz, for example, a frequency of twenty kilohertz to one hundred or more, with higher energy, may be employed so as to subject a given liquid medium bulk to an initial burst in nucleate cavitation and thereafter multiple high-frequency acoustic cycles during its shorter duration of exposure. A given point in a liquid medium bulk passing under a ten centimeter-wide transducer strip at a hull speed of fifty-five knots (about twenty-seven meters/second or about one inch per millisecond), for example, would be exposed to about one hundred and fifty cycles of forty kilohertz acoustic energy at 100% duty cycle (no on-off switching). At a 10% duty cycle, or fifteen cycles, the liquid medium may still be fractured and nucleated cavitation bubbles may still be populated (e.g., split) or further grown through rectified diffusion of bubble-size oscillation during which ambient entrained air in the liquid medium is absorbed by the bubble cavity.

In addition, a larger portion of available on-board power may be alternately or successively applied to one or more of the multiple insonifying strips on a rotating or round-robin basis to increase the power density of a particular strip or strips to which the energy is applied. For example, rather than exposing the given liquid medium bulk to one to ten watts per square centimeter under a given strip, the power density may be increased one or two orders of magnitude for a shorter duration, e.g. ten to one hundred or more watts per square centimeter, or even one or several thousand watts per centimeter, if necessary. This may be made possible my directing all (or a substantial portion) of the acoustic energy from the on-board acoustic generator to a single insonification strip (or two insonification strips), and then rotating the available energy to another strips or other strips, so as to maintain a cloud of microbubbles in the boundary layer of the wetted area of the hull.

Alternatively or in addition, the insonifying strips, rather than extending generally perpendicular from the central keel line to the chines, may extend at a swept angle (e.g., between thirty to sixty degrees (more or less)) from the keel line in order to increase exposure time of a given liquid medium bulk to insonifying energy relative to the direction of water flow.

Because skin friction drag is advantageously reduced, the marine design engineer may now be less concerned with increased drag associated with sharpness of the Vee-hull or the pad keel. Higher deadrise angles provide smoother rides in rough seas but in conventional shallow-Vee hulls, more power (and greater fuel consumption) was required to overcome additional drag due to increased wetted area. Thus, the present invention advantageously enables smoother rides in rough water utilizing a deadrise of thirty, forty, fifty or more degrees. Relative to the transom deadrise, pad keel 40 may also have a deeper Vee for increased yaw stability at high speeds, rather than a shallower Vee to provide additional lift, as currently practiced in the art. Higher speeds of the deeper Vee compensates for any loss in lift. In general, the entire hull 10 advantageously may now be provided with a deeper Vee along the entire keel without the additional drag impediments of conventional hulls, stepped or otherwise.

Figure 2:
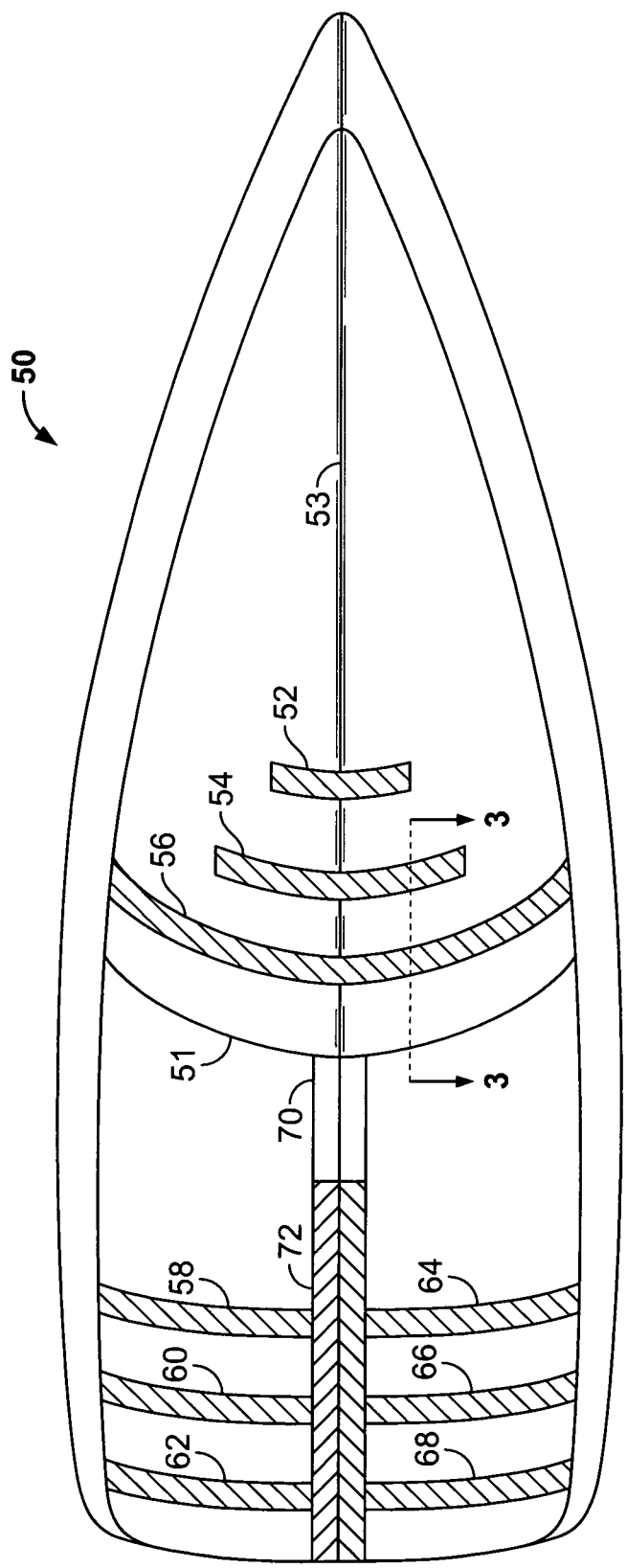
FIG. 2 is a bottom view of a hull that including insonification strips or transducer sections according to another aspect of the present invention.

FIG. 2 shows a hull 50 similar to the hull 10 of FIG. 1 that has a fore section and aft section separate by step 51. The fore section includes flush-mounted, one-piece sonification strips 52, 54, and 56 that straddle a forward keel line 53 within a wetted area generally located by the layout area of the sonification strips. The aft section of hull 50 includes a series of sonification strips 58, 60, and 62 extending from pad keel 70 on the starboard side of hull 50, and a series of sonification strips 64, 66, and 68 extending from pad keel 70 on the port side of hull 50. In practice, each of the group of strips 52-56, 58-62, and 64-68 may comprise a sonification plate (contoured to the shape of the hull) having multiple transducers inside where the plates are affixed to respective portions of the hull occupied by the respective groups. The plates comprise ten-gage or twelve-gage stainless steel (304Stainless or marine grade 316Stainless) in which transducers are hermetically sealed to form an acoustic diaphragm on one side thereof. Elsewhere in this description, one or more sonification strips may be replaced with one or more such sonification plates incorporating such strips where the plates are bolted otherwise affixed to the hull. In light of commercially available transducers, the plate would generally be about five to six centimeters thick, and would include a supporting members, flanges, other material (e.g., a honey-combed grate structure between upper and lower surfaces of the plate with transducers mounted inside the honeycomb areas) between transducers to prevent collapsing against the weight of the vessel when resting aground in shallow waters, or supported on land or in a dry-dock. In the event of a puncture or fatigue cracking of the plate material, the sonification plate may be filled with a closed-cell marine foam to embed and seal the transducers and connecting wiring, for example, to confine any salt water to the punctured or cracked region thereby preventing shorting of internal circuits. A portion 72 of pad keel 72 is also equipped with sonification plates.

Figure 3:
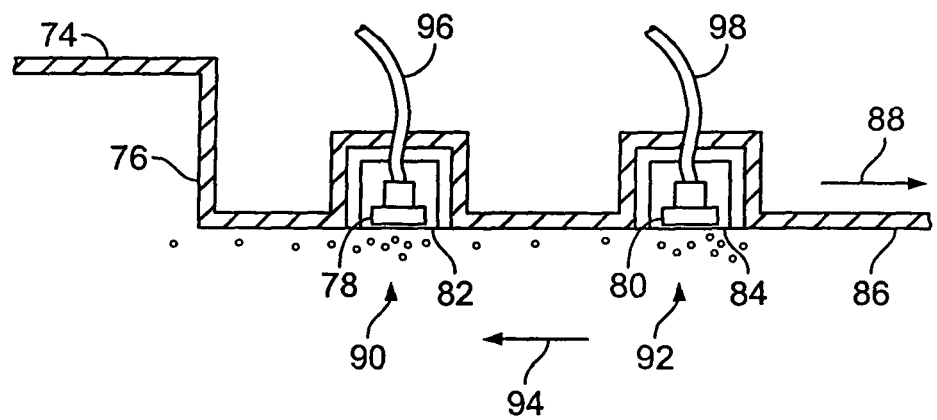
FIG. 3 is a cross-cut of section 3-3 of FIG. 2 showing a housing and insonifying transducers embedded within a fiberglass hull skin of the vessel shown in FIG. 2.

FIG. 3 shows a hull-imbedded arrangement of insonifying transducers positioned in a cross-cut section 3-3 of FIG. 2 where hull skin 74 (e.g., fiberglass, epoxy, carbon fiber, composite, or other materials (e.g., wood, aluminum or other metals)) forms step 76 to ventilate the aft section of the hull when immersed in a liquid medium. This embodiment is practicable where the hull material has the ability to withstand cavitation implosion events precipitated by the transducers, or where microcavitation is controlled to minimize cavitation fatigue failure or damage. In the cross-cut, only one transducer is shown in each sonification strip, it being understood that each strips contains multiple transducers or other acoustic generating devices. In forward of step 76 there is shown a number of insonifying transducers 78, 80 (such as Langevin Ultrasonic Transducers, Model No. CN4038-50AP8 commercially available from Clangsonci) respectively encased in a stainless steel housings 82 and 84 that respectively form sonification strips 56 and 54 (FIG. 2). Housing 82, 84 may comprise other materials including Teflon (or Teflon-coated), a polymer-based material, aluminum, bronze, or other materials). As indicated above, the housings 82, 84 are flush-mounted with the hull skin 86. Housings 82, 84 are also mounted within a trough of the hull with a small vibratory insulating and sealant material of silicone (or other material) in the spacing between the housing and the fiberglass hull skin which, for example, may be a few millimeters. Other fastening systems (e.g., bolts and/or clamps) may also be employed. In a desired configuration, stainless steel housing is sealed at its joints by welding to preventingress of water. Electrical power cords 96 and 98 supply acoustic energy to the transducers.

Instead of mounting the housings within a preformed trough in the hull, the hull material, e.g., fiberglass or composite, may be formed over or with the housing to create an integrated structure with no spacing between the housing and the hull material. In essence, the fiberglass or composite is laid over and bonded with the transducer housings 82, 84 during the hull construction process. This may be desired to provide a rigid mechanical backing (additional reactive solid mass) for piezoelectric or magneto-restrictive transducer operation in order to more efficiently transfer acoustic energy to the forward face of the transducer and thus to the liquid medium. In this case, the housing may be configured with access plates to enable opening thereof to repair or replace a transducer when necessary. The cross-cut shows right-angle bends of the hulls for illustrative purposes but in practice the hull may by layered over the transducer housings in a more contoured fashion to improve hull strength, resistance to cracking, and resistance to slamming and bending forces typically experienced by the hull when underway. In addition, hull stringers may be formed in or placed over the sonification strips to improve strength.

As the vessel proceeds over water in a direction indicated by arrow 88, microcavitation bubbles 90, 92 in a wetted area of the liquid medium (e.g., seawater) respectively generated by transducers 78, 80 flow relative to hull skin 86 in a direction indicated by arrow 94. Advantageously, transducer cooling is provided by heat transferred directly to the metallic housing (e.g., stainless steel) when contacting the liquid insonified medium. For purposes of illustration, only a few cavitation bubbles 90, 92 are shown although in actual practice, cavitation bubbles may number in the millions or billions or more. Transient microcavitation bubbles are instantaneously nucleated and grown by the transducers in the boundary layer of hull skin 86 and are relatively concentrated immediately under the transducers. As indicated above and in the related applications, acoustic energy is applied to the transducers sufficient to generate a quantity and quality of microbubbles to sever the viscous adhesion of surrounding liquid near the hull skin so that, when underway at high speeds, the hull drags or "pulls along" less water along with the hull's direction of movement. This way, skin friction drag is significantly reduced. The microbubbles begin to thin out as they flow aftward of the hull but the amount of power applied to the transducers may be controlled to maintain an adequate microbubble concentration.

Figure 4:
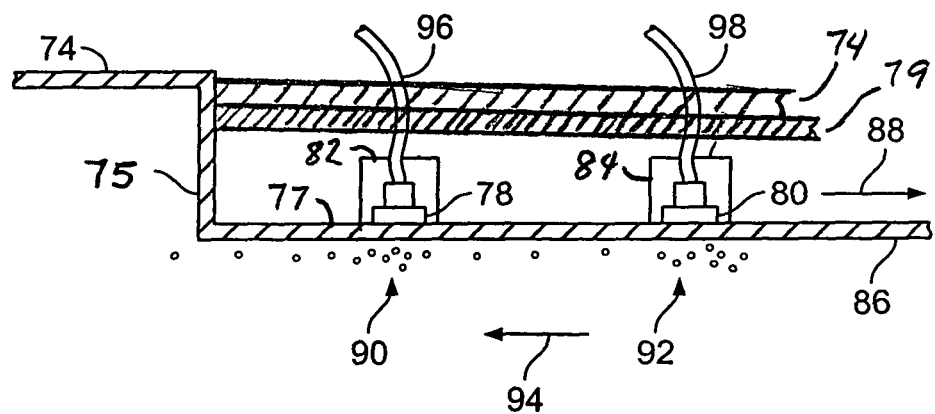
FIG. 4 shows an alternative arrangement of a housing and insonifying transducers of FIG. 3 where transducers are mounted in a sonification plate, which is then affixed to the hull of a vessel.

FIG. 4 shows an alternative arrangement of insonifying transducers in a cross-cut of a hull similar to FIG. 3 wherein like reference numerals indicate like elements. In this case, however, the transducers 78, 80 are mounted inside a sonification plate 75, which is affixed to hull 74 by conventional means (e.g., bolting) so that an abutment side 79 of sonification plate 75 fixedly joins hull 74. Insonifying energy of transducers 78, 80 is projected into the water medium through a diaphragm side 77 of sonification plate 75, which may comprise ten or twelve gage marine grade stainless steel. The hull may comprise fiberglass, steel, aluminum, or a composite material such as carbon fibers provided the material is not subject to fatigue failure due to cavitation implosion or other events. Plate 75 may be filled with a water-blocking material, such as a closed-cell marine foam, to prevent electrical shorting of the transducers or their associated circuits in the event of a puncture, erosion, or other failure of the sonification plate. Plate 75 may also include vertical flanges or support members to prevent collapse against the weight of the vessel when aground at sea or dry docked. By employing a separate plate 75 to embody the transducers, the hull material is better protected from cavitation damage. In addition, use of the cavitation plate enables more convenient adaptation of insonifying transducers to marine vessels, without requiring much hull modification. Due to heating of the transducers during operation, seawater cooling is not provided as with the sonification strips of FIG. 3. Accordingly, cooling fins may be installed on housing 82, 84 to radiate excess heat.

Figure 5A:
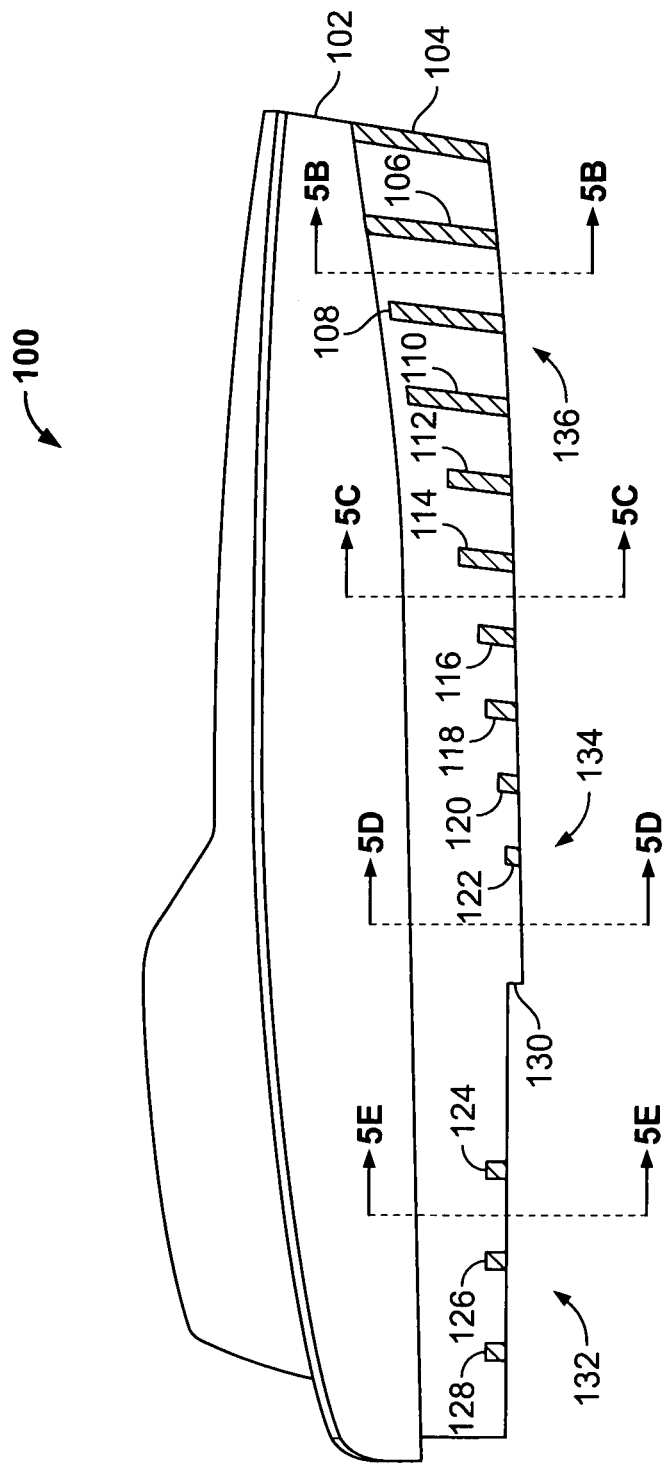
FIG. 5A shows an exemplary narrow beam vessel having a wave-piercing bow and a series of insonifying transducer arrays sections in the hull bottom and bow according to another aspect of the present invention.

FIG. 5A shows a wave-piercing marine vessel 100 incorporating principals of the present invention where a relatively narrower bow 102 includes a wave-piercing insonification edge 104 (i.e., an axe bow) generally above the water line to induce cavitation bubble in approaching waves as the vessel 100 speeds across the surface of the ocean. As series of additional insonification strips 106 through 122 are positioned on the side of the hull from the bow to amidship fore of step 130, and another series of insonification strips 124-128 are positioned in a section of the hull aft of the step 130. When underway at high speeds (e.g., fifty to one hundred knots), the vessel rides generally level on a wetted area of the stern 132 and wetted section of the amidship hull just fore of step 134. During rough sea state condition (e.g., sea state four, five, or six) bow wave wet the fore section 136 of the hull. Skin friction drag periodically and intermittently induced by bow waves is advantageously reduced thereby providing a smoother ride and less average drag.

FIGS. 5B, 5C, 5D, and 5E show hull profiles of the marine vessel of FIG. 5A along sections B-B, C-C, D-D, and EE in order to illustrate the relatively narrow beam at various location along the hull relative to the overall length of the vessel.

Figure 6:
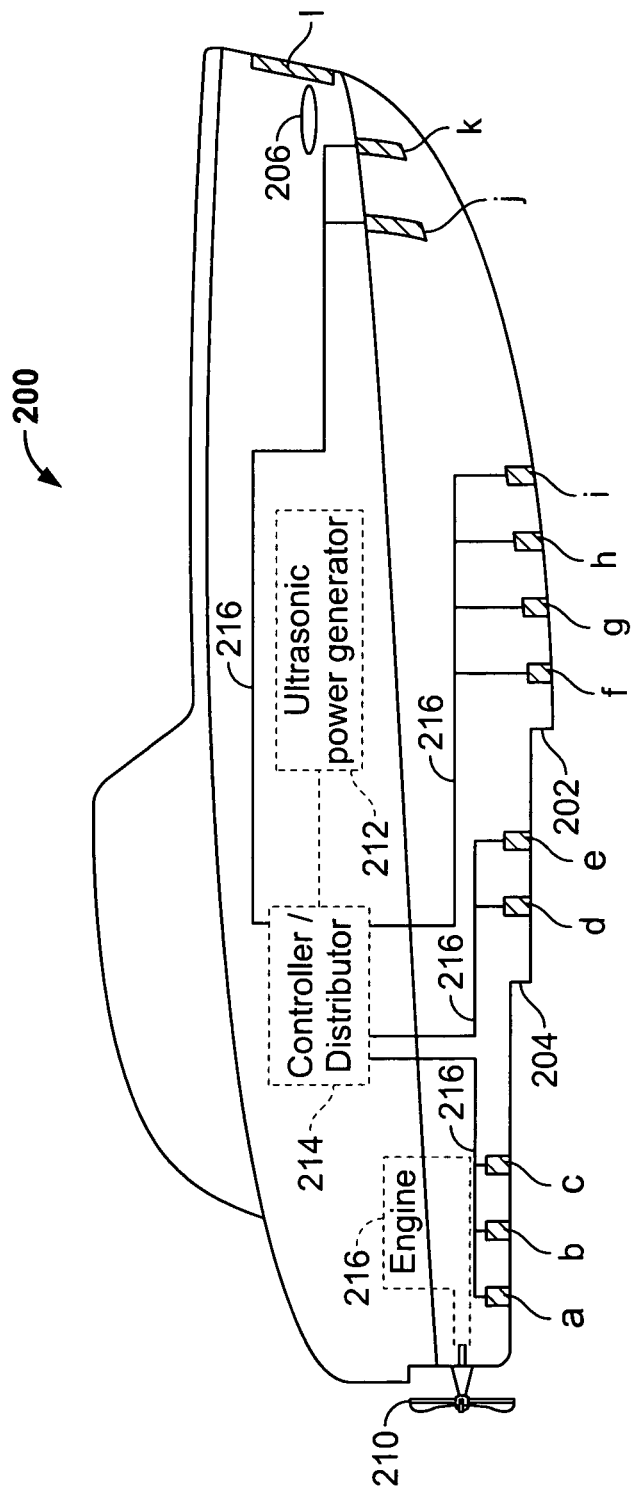
FIG. 6 shows an exemplary narrow beam wave-piercing vessel having a series of insonifying transducer sections in the wetted area of the hull and in a bow section, as well as an acoustic generator and a controller to distribute insonifying signals to the transducers according to another aspect of the present invention.
Figure 7:
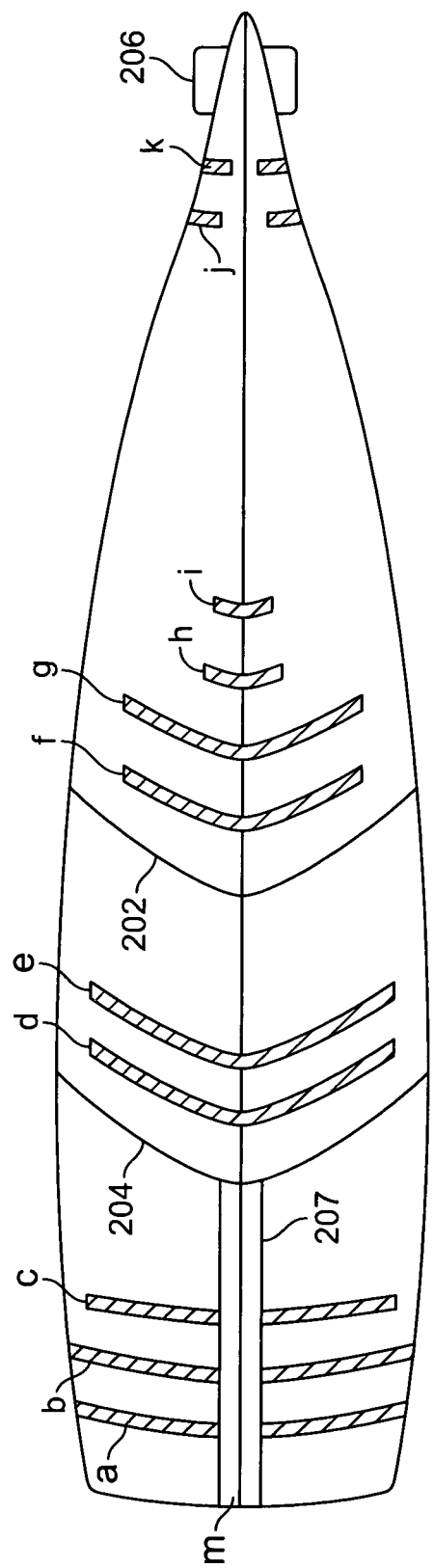
FIG. 7 shows an arrangement of transducer sections on the hull of the vessel of FIG. 6.

FIGS. 6 and 7 respectively show side and bottom views of a high-speed wave-piercing marine vessel 200 having a stepped hull also including an arrangement of insonification strips according to the present invention. Vessel 200 includes multiple steps 202 and 204 as well as a series of insonification strips a, b and c in an aft hull section; a second series of insonification strips d and e in an amidship hull section, and a third series of insonification strips f, g, h, and i in a fore hull section, which are generally positioned in a wetted area of the hull as existing at high speeds. Although two steps 202 and 204 are shown, the vessel may have zero steps, or three or more steps. To assist in reducing wave drag in a bow section, insonification strips j, k, and l, are provided, as explained in connection with FIG. 5A. An insonification section m of a pad keel is also provided. In addition to insonification strips in the bow, hull 200 includes a small wing 206 to help keep the vessel on the surface when periodically or intermittently piercing bow-encountered waves while running at high speeds. Thus, the vertical position of wing 206 would be a function of wave height. The surface of wing 206 may also be insonified to reduce skin friction drag thereat.

An engine 208 of suitable power level drives a surface drive propeller 210 at exemplary speeds of sixty to one hundred knots. Surface drive (e.g., surface piercing) propellers operate more effectively in a cavitation environment, and thus are preferred. For the illustrated vessel of sixty to eight feet, the total power is estimated between six hundred and one thousand horsepower. Vessel 200 may utilize multiple engines and propellers although only one is shown. Jet drive or an inboard-outboard drive (Z-drive) or surface drives may also be used to propel the vessel. An on-board ultrasonic generator 212 produces ultrasonic signals in the range of twenty to one hundred kilocycles of an adequate power level to induce or nucleate cavitation and, for an exemplary twenty to sixty-ton vessel having a length overall of thirty to fifty meters, a generator producing about thirty to one hundred kilowatts, more or less, may be used. A power controller/distributor 214 includes a electrical power buss to receive ad distribute available on-board acoustic power from the generator 212 to and among transducers within the insonification strips or sections a through m according to a special exemplary excitation pattern shown in FIG. 8. An electrical harness 216 carries high power acoustic signals to respective transducers in the insonification strips or sections a through m.

Figure 8A:
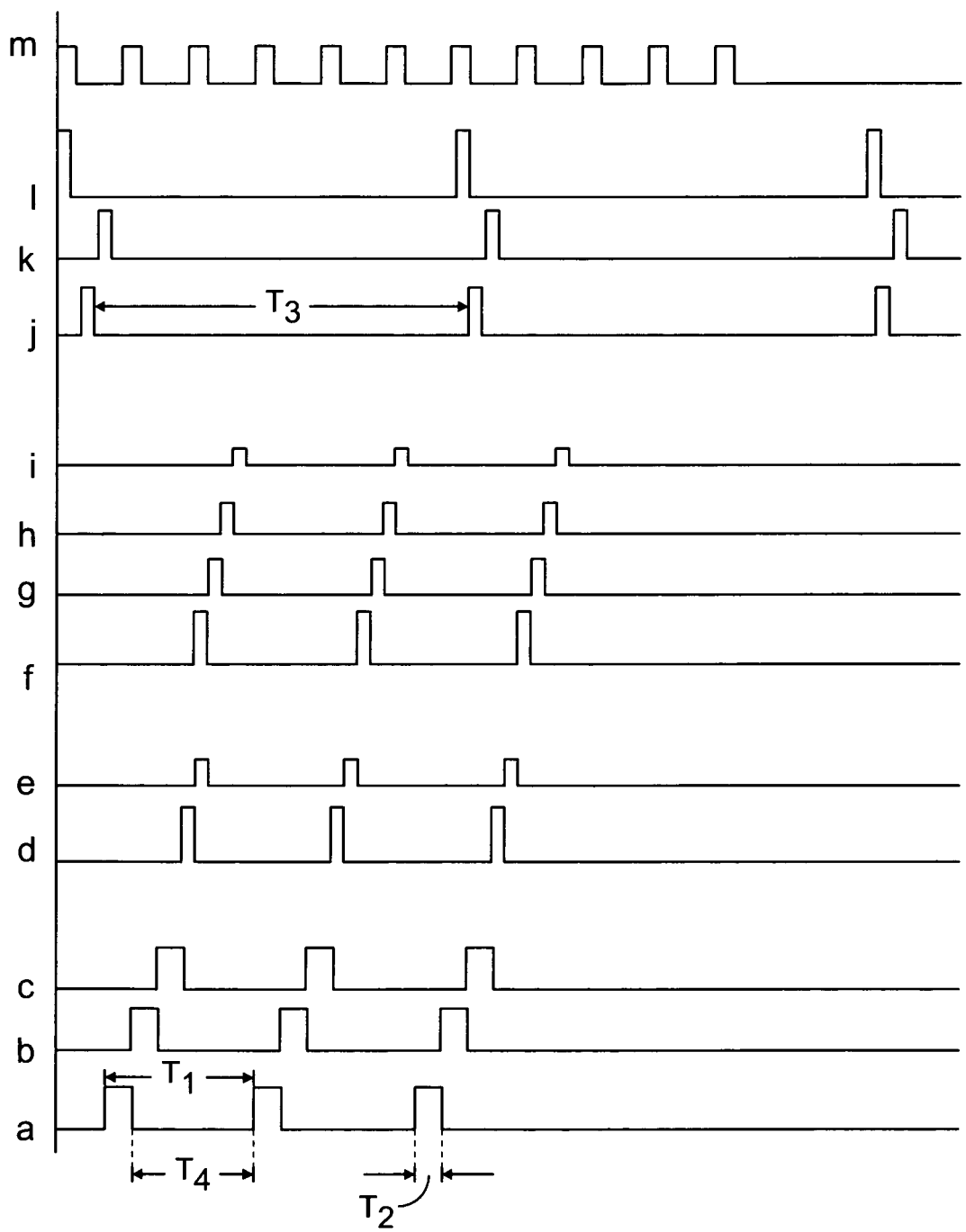
FIG. 8A shows on-time insonifying power applied to the respective transducer or transducers sections of the vessel of FIGS. 6 and 7.

FIG. 8A shows, an exemplary excitation pattern or "on-time" of the sonification strips a through m of the vessel of FIGS. 6 and 7. The application of power from an acoustic generator to transducer arrays according to these timing signals may be implemented by timing circuits and relays, or by commercially available programmable logic control (PLC) modules or programmable logic relays, such as those available from Omegamation, Automation Direct, Panasonic, Toshiba, Seimens, Pyramid Industries, General Electric, and others. Acoustic generators and transducers are commercially available from many supplies, including Blackstone, Clangsonic, and Branson. The illustrated levels of the "on-time" signals indicate varying acoustic power levels applied to the respective sonification strips. Each pulse represents the ON time of a tone burst of high-frequency acoustic energy (e.g., somewhere between eighteen and two hundred kilohertz) applied to a transducer or an array of transducers arranged in a strip or other pattern sufficient to nucleate cavitation and/or populate or grow cavitation bubbles in the liquid medium. The tone burst is preferably inharmonic, e.g., a square-wave or triangular-wave signal, instead of sinusoidal to provide a broad spectrum of acoustic signals, which facilitates nucleation of cavitation. A sinusoidal wave may also be employed. In low sea state conditions, e.g., sea states one through three, for example, available on-board acoustic power is generally supplied to sonification strips a through i and m at a frequency of twenty to one hundred kilohertz. Viewing signal a applied to sonification strip a, controller/distributor 214 (FIG. 6) may control pulse spacing T1 and represents pulse width (i.e., ON time), or duty cycle, T2 of high-frequency acoustic energy in order to regulate the amount of acoustic energy applied to the sonification strips.

Controller 214 may also control the magnitude of the high-frequency pulses. For example, utilizing a five to fifty-kilowatt acoustic generator with the illustrated excitation pattern, up to fifty kilowatts may successively or alternately be applied to each of the relatively larger sonification strips a, b, and c at a duty cycle of, say 10% each more or less, to generate microbubbles in the aft hull section of hull 200. Duty cycle may vary from one to fifty percent. Strips e and d may be relatively smaller due to a smaller wetted area to be insonified thereat. As such, the extent of acoustic excitation as indicated by pulses e and f may have a smaller duty cycle, of say 5% each. Likewise, the excitation pulses of sonification strips f through i may each be successively or simultaneously excited for a duration of 5% duty cycle to generate microbubbles in an aft section of the hull. Thus, groups a through i, in the illustrated excitation pattern, consume 60% of the duty cycle and there yet remain addition cycle time that may be applied to the insonification strips.

In FIG. 8A, the time period $\tau_1$ for exemplary pulse train a may be fifty to one hundred milliseconds. The pulse spacing as regulated by time $\tau_1$ may be varied to achieve a duty cycle of five to ten percent or, as needed, according to the speed for vessel and the width, i.e., exposure time of a bulk of water medium to insonifying energy, of the sonification strip. Intensity may be increased with lower duty cycles. For example, wind-blown sea water has a cavitation threshold of about 0.5 watts per square centimeter. Instead of pulsing the transducers with an average of 0.5 continuous watts, the intensity level may increase one or two orders of magnitude with shorter duty-cycle tone bursts in order to maintain, for example, an average acoustic energy intensity imparted to the water between 0.1 and 10.0 watts per square centimeter, more or less, depending on speed of the vessel and conditions of the water medium at the sea surface. The desired duty cycle and intensity level are generally inversely proportional, and many excitation schemes or patterns may be implemented to control microbubbles to a desired population, size, and or density to achieve drag reduction. As vessel speed increases, greater microbubble growth and creation is generally required. Thus, the nature of the acoustic pattern may be controlled, adjusted, or regulated according to vessel speed. Parameters of the acoustic generated may be predetermined for optimum drag reduction according vessel speed and/or water conditions (e.g., temperature, atmospheric barometric pressure, or other conditions).

A signal m of higher duty cycle is applied to transducers of the pad keel 207 since the vessel continuously rides on the pad keel when on plane. In one embodiment, a 50% duty cycle or higher or lower may be applied to the pad keel transducers although the duty cycle and power level may vary according to water conditions and the vessel's speed.

Since sonification strips j through l are only needed during rough sea conditions, power may be consumed thereat only when needed. In addition, an appropriate sonar, acoustic, electrical, water pressure or other sensor may be installed at the bow of vessel 200 to automatically activate or supply acoustic power to wing 206 and/or sonification strips j through l according to a desired power level and pulse spacing $T_3$ upon detecting oncoming bow waves. The sensor may even simply comprise electrical contacts to sense the presence of fresh or salt water at a particular level of the bow, i.e., wave impingement, by sensing a short-circuit or an impedance reduction between electrical contacts positioned on the bow at a desired level. When metallic (e.g., conductive material) housings are employed for the insonifying transducers, an electrical circuit may be established between a wetted housing and a more continuous common ground point (e.g., a metallic housing at the stern (such as a pad keel)) in order to sense a wetted condition at the bow.

Alternatively, the vessel may include a sufficiently large ultrasonic power source simultaneously to supply each insonification strips or sections at a one hundred percent duty cycle, or less. The distributor/controller, on the other hand, enables use of a smaller ultrasonic power source if possible.

FIG. 8B shows exemplary on-time/off-time (e.g., duty cycle) signal a represented by a square wave that controls the on-time burst of acoustic energy applied to a transducer or an array of transducers. The on-time duty-cycle may range from one to one hundred percent. Tone burst spacing may also be varied. FIG. 8C shows an exemplary square-wave burst of acoustic energy applied to insonifying transducers during the on-time indicated by the square wave of FIG. 8A. The magnitude of the FIG. 8C tone burst signal is sufficient to energy transducers to impart acoustic wave energy to the water above its cavitation threshold, which acoustic energy may range from the cavitation threshold of the water up to an instantaneous acoustic level of several hundred (or even several thousand) watts per square centimeter. The transducers themselves are generally pulsed between two and six hundred volts at a desired tone burst frequency from eighteen to two hundred kilowatts. The frequency is determined, for a given vessel speed (and consequent exposure time of nucleated cavitation bubbles to acoustic waves), according to the surface conditions of the water medium, i.e., that which produces the optimum size, population, and density of microcavitation bubbles (e.g., somewhere between fifty and two hundred micrometers (microns), more or less) in order to provide optimum drag reduction. If using high voltage, pulsing the transducers with tone bursts at less than 100% duty cycle allows the transducers to cool without overheating destruction, and because water-cooling is provided through the stainless steel diaphragm of the sonification plate, the transducers may be pulsed with even higher instantaneous voltages, e.g., several thousand volts, in order to deliver greater acoustic energy to the boundary layer fluid medium.

In an exemplary embodiment, for a given vessel power setting and water temperature, a vessel operator or an automated control system may (i) vary or decrease the acoustic intensity to determine the lowest intensity level $I_O$ at which no addition speed is lost (advantageously, this enables the lowest power consumption for the acoustic signal generator), (ii) vary or lower the duty cycle or pulse spacing (time between tone bursts) to determine the lowest duty cycle $D_O$ at which no additional speed is lost (advantageously, this also enables the lowest power consumption for the acoustic signal generator), (iii) vary the frequency of the tone burst (increase or decrease) to determine the optimum frequency $F_O$ at which greatest speed is attained (e.g., greatest drag reduction), or (iv) vary other acoustic signal parameters to determine the optimum $P_O$ setting for minimum drag (i.e., greatest speed). Because duty cycle and intensity settings are inversely proportional, it may become an iterative process to determine the optimum duty cycle for a given intensity level, or an optimum intensity level for a given duty cycle. Once the optimized parameters $I_O$, $D_O$, $F_O$, and $P_O$ are determined, the operator or automated controller may maintain these parameters of the acoustic signal generator for optimum drag reduction. In many cases, the operator or automated controller need only vary intensity level and/or duty cycle of the acoustic signal generator since an optimum acoustic frequency of insonification may be pre-established for a given region of the ocean or other body of water.

Advantageously, and in accordance with the present invention, the vessel operator or automated controller may "dial in" or regulate acoustic signal parameters in accordance with vessel operational status (e.g., speed, power setting, etc.) and/or surface conditions of the water medium encountered at sea for optimum drag reduction. For an anticipated vessel operating status (e.g., speed or power setting) and known sea surface conditions, acoustic signal parameters of the acoustic generator may be predetermined for vessel operation and supplied to transducers without the necessity of continued monitoring of sea surface condition and control of the signal generator. This becomes significant taking into consideration a fuel consumption of fifty to two hundred gallons per hour otherwise consumed by small planing yachts and passenger vessels.

Figure 8D:
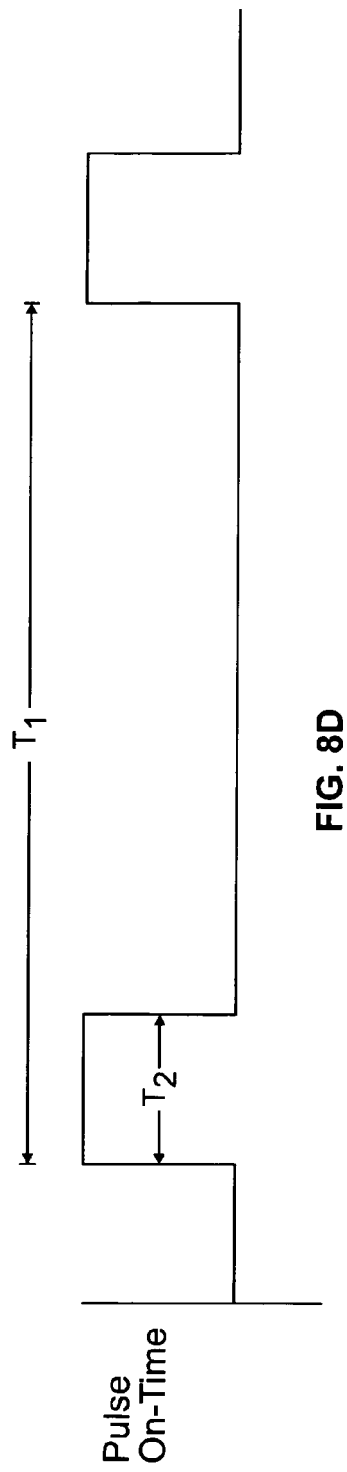
FIGS. 8D and 8E show the nature of the high-frequency acoustic tone burst signal that may be applied to the transducers during the on-time indicated in FIG. 8D where the initial portion of the burst signal has a higher level in order to more effectively nucleate and split cavitation bubbles where a following high-frequency town burst signal operates to grow cavitation bubbles via rectified diffusion.
Figure 8E:
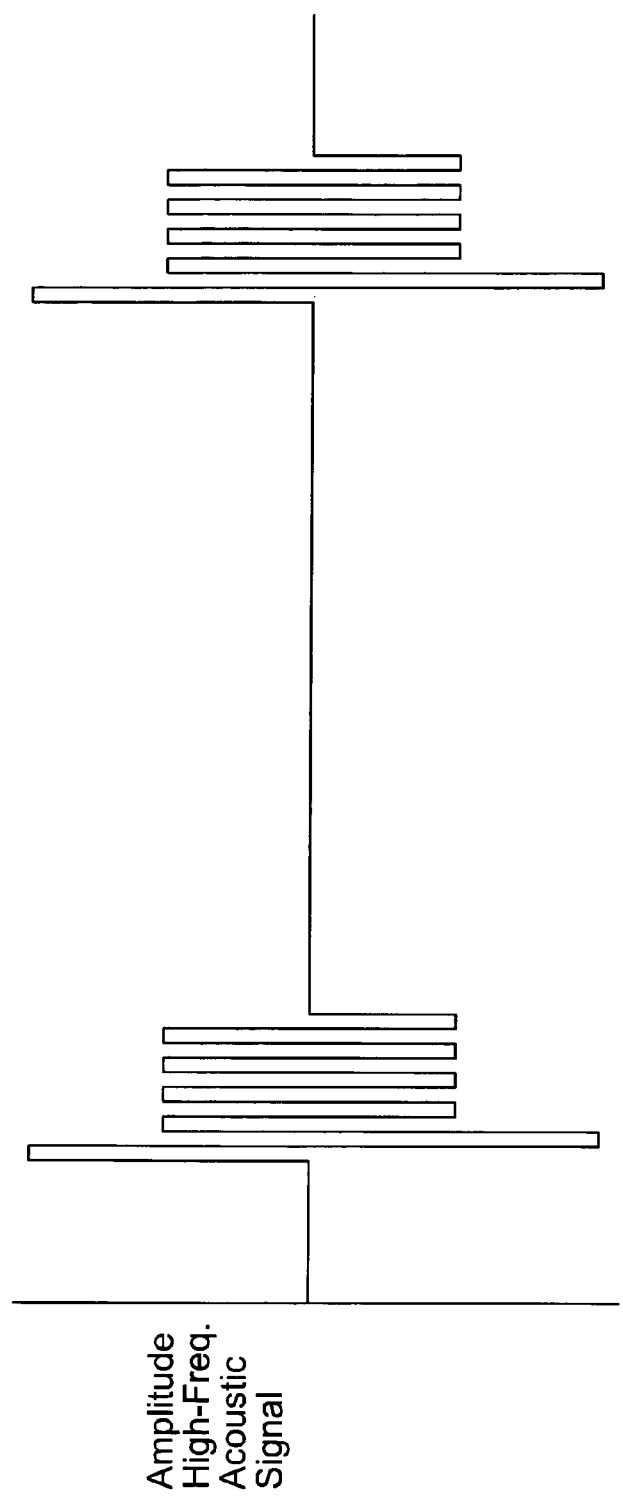

FIG. 8D shows exemplary on-time/off-time signal a represented by a square wave that controls duration of on-time burst of acoustic energy applied to a transducer or an array of transducers while FIG. 8E shows an exemplary square-wave burst of acoustic energy having a higher initial level and a subsequent lower level applied to insonifying transducers during the on-time indicated by the square wave of FIG. 8D. Higher initial levels better initiate a nucleation of cavitation while the subsequent lower lever grows initiated cavitation bubbles. This helps conserve overall acoustic power needed during system operation. Instead of a stepped decrease from the higher level, the level may gradually decay, exponentially or otherwise, to a lower level. The lower level may optionally become steady-state.

Figure 8F:
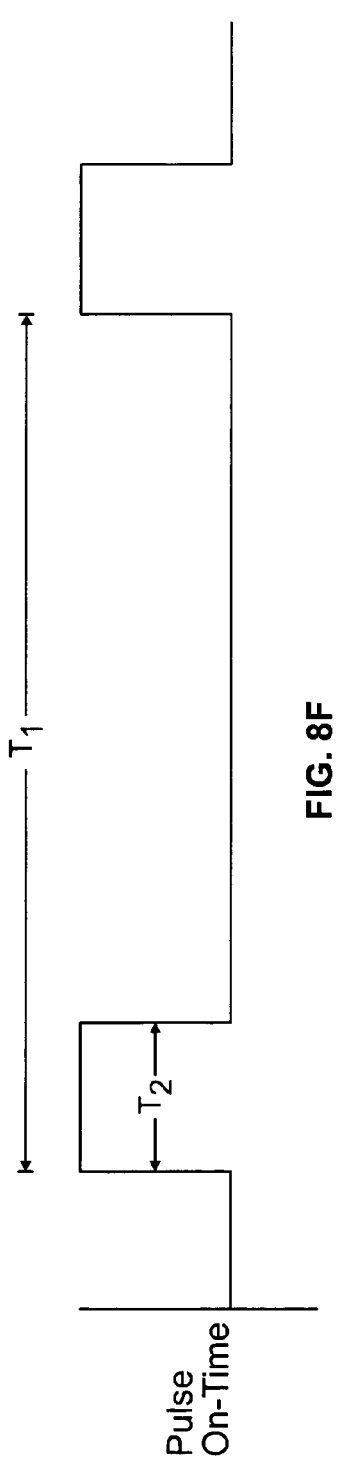
FIGS. 8F and 8G show the nature of the high-frequency acoustic tone burst signal applied to the transducers during the on-time indicated in FIG. 8F where the initial portion of the tone burst signal has a higher level to better nucleate and split cavitation bubbles and where a following higher-frequency burst signal operates to grow cavitation bubbles via rectified.
Figure 8G:
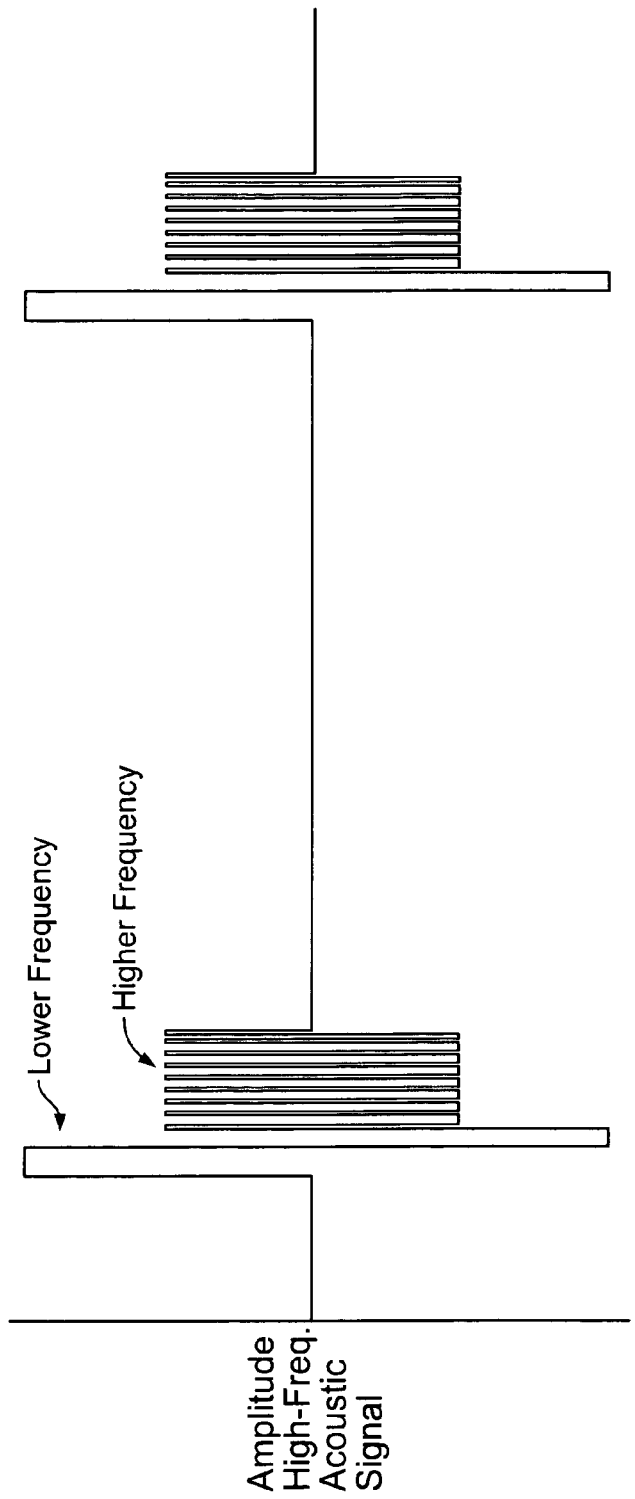

FIG. 8F shows exemplary on-time/off-time signal a represented by a square wave that controls the duration of the on-time burst of acoustic energy applied to a transducer or an array of transducers while FIG. 8G shows an exemplary square-wave burst of acoustic energy having a higher initial level and a subsequent lower level burst of energy at a higher frequency that is applied to insonifying transducers during the on-time indicated by the square wave of FIG. 8F. Instead of a stepped decrease in level, the level may start at a high level and gradually decay, exponentially or otherwise, to a lower level. The lower level may optionally become steady-state. The subsequent higher frequency helps to grow cavitation bubbles at a faster rate when the vessel is operated at higher speeds when the exposure time is less.

Instead of a square-wave burst, a triangular-wave burst of acoustic energy may also be applied to the transducers.

In each case, the acoustic burst signal may be swept in frequency anywhere between a range of eighteen and two hundred kilohertz. Generally, the nature and power level of the acoustic signal applied to the transducer depends on the nature of the liquid medium, e.g., sea, lake, or river water. In certain conditions, e.g., high entrained air, large quantity of suspended particulate matter, or warmer water, cavitation threshold is lower and less power is required. Cavitation may be nucleated on suspended gases and phase boundaries (liquid-solid or liquid-gas) in response to the acoustic waves. Certain gas cavities already suspended in the liquid (e.g., entrained air) may be split into multiple microbubbles. When microbubbles are exposed to continued acoustic waves, they may be grown via rectified diffusion. After grown, they may be further split into smaller microbubbles. Thus, an adjustment in power level, frequency, duty cycle, etc. may be made according to water conditions to control such microcavitation activity to a desired level to achieve a desired friction reduction.

The acoustic signal parameters may be made by manual adjustment based on observed physical conditions of the water aft of the vessel, speed, ease of acceleration, cavitation sensors; or automatically by employing a sensor feedback signal to the controller 214. The sensor feedback signal may comprise microbubble sensor to sense presence of cavitation bubbles near a transducer or elsewhere aft of the transducer, by measuring loading on a strain gage or load cell affixed between the hull and a sonification plate, by monitoring electrical loading of one or more transducers during operation to detect changes in reactive loading when exposed to air, liquid, or cavitated liquid medium, and by sensing completion of an electric circuit between a transducer section and a common ground point, as noted above. The detected changes may be used by the controller 214 to terminate or alter the applied acoustic signal levels, to alter the duty cycle thereof, and/or change frequency of operation.

Similar to the sensor on the bow to detect wave impingement, sensors may also be collocated with insonification sections or strips and sensed by the controller in order to automatically deactivate them when aerated so that they do not needlessly consume acoustic power. In this fashion, more of the available on-board acoustic signal may be directed to other sonification strips or sections, where needed. The sonification-sensor arrangement enables the vessel's captain or the controller 214, in response to the impedance/resistance measurement, to advantageously compensate or adjust power distribution in accordance with the vessel's trim angle (i.e., pitch angle), speed, fore-aft load variances of the vessel, or during periods of airborne "skipping" of the vessel over the water surface.

In fact, electrical impedance/resistance may be measured between any pair of fore-to-aft electrically conducting (e.g., stainless steel) transducer housings, or beam-to-beam housings of transducer sections, to provide a control or feedback signal to the controller 214 as an indication of wetness of a fore-most section/strip or an outer-most beam transducer section. Such indication or impedance/resistance measurement may be utilized by the controller 214 to automatically redirect acoustic energy to other transducers or automatically curtail needless consumption of acoustic energy by "dry" or "aerated" transducer regions in the expected wetted region of the hull. Moreover, the controller 214 may "electronically" steer or turn the vessel by the captain adjusting relative acoustic power applied to port-side and starboard-side acoustic transducers. Such adjusting impact the relative amounts of drag experienced by the port and starboard sides of vessel which, in turn, steers the vessel when underway. This way, drag may further be reduced since steering may be achieved without a drag-laden rudder or other empennage.

As a safety feature, the wiring harness or power supply that supplies power to the transducers may be arranged so as to minimize asymmetric drag (or asymmetric drag reduction) in the event that a transducer or power circuit fails. For example, wiring may be arranged to energize transducer pairs where each member of the pair resides on opposite sides of and equidistant from the keel so that when one transducer fails both are shut down together. Alternatively, sensors may be provided on or near the transducers to detect their operations. When the controller detects a complete or partial failure of one transducer, it may automatically shut down power to both the failed transducer and an equidistant opposite-side transducer. Other schemes or systems may be employed to maintain equal drag, or equal drag reduction, on each side of the vessel in the event of a complete or partial failure of a transducer, or a complete or partial failure of transducer strip or section.

Figure 9A:
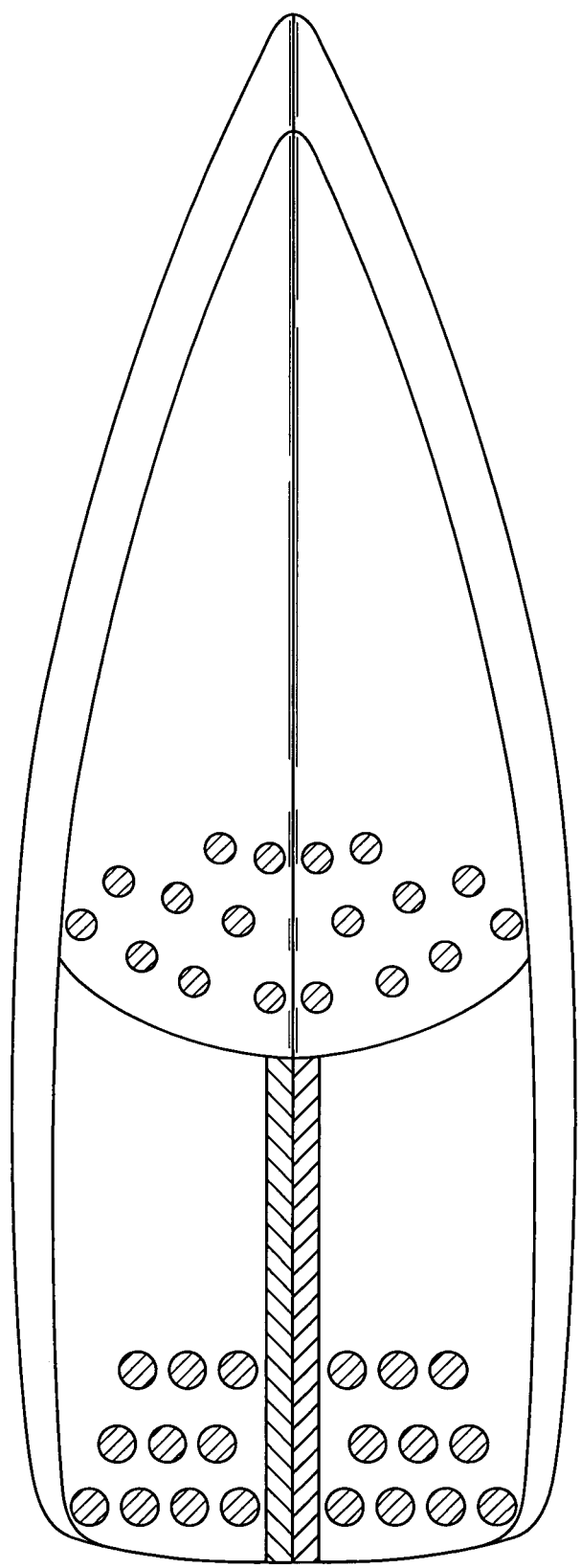
FIGS. 9A and 9B show alternative arrangement of insonification sections on a hull of a vessel.

FIG. 9A shows an alternative layout of circular sonification pods instead of multi-transducer arrays positioned in a wetted region of a hull. In physical construction, a pod receiver may comprises a stainless steel or resin cup form into or cured with the hull (fiberglass, composite, steel, aluminum or other material) having female threads to receive a stainless steel housing of an insonification pod having male threads. A through-hull orifice in the pod receiver receives a conductor of the insonification pod that supplies power to the transducer inside the pod.

Figure 9B:
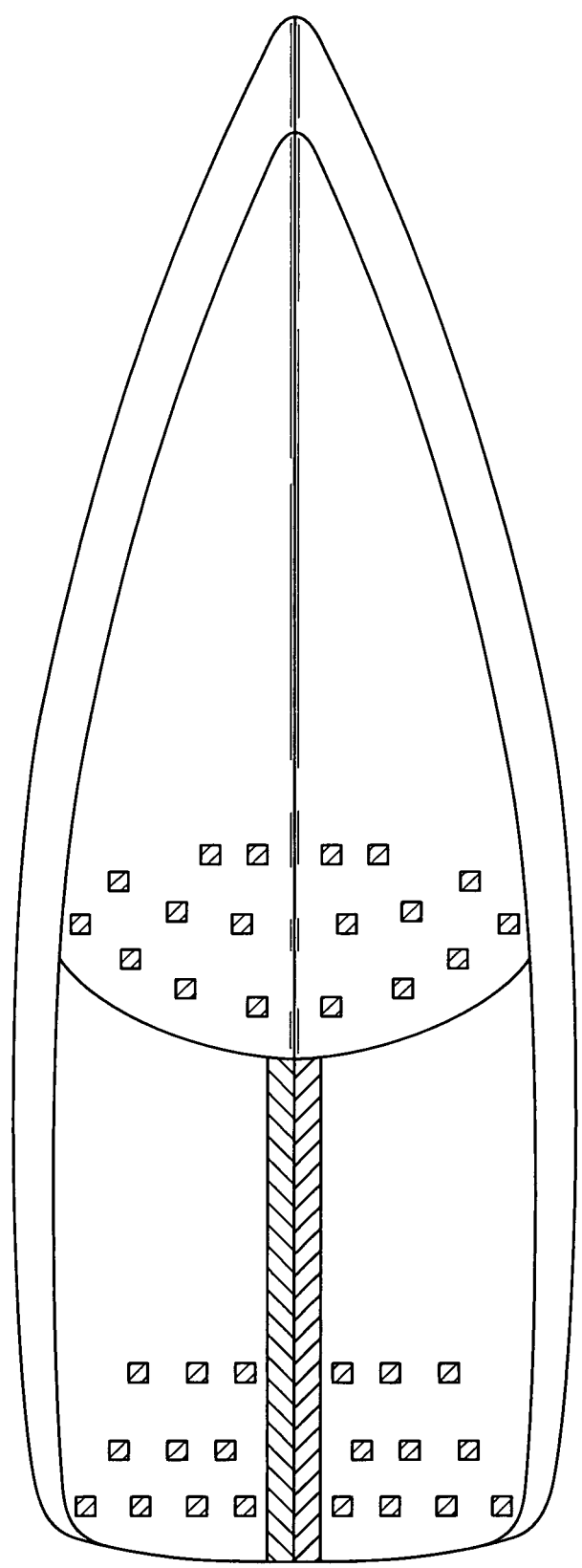

FIG. 9B shows an alternative layout of disjointed sonification sections of rectangular or square pods instead of multi-transducer strips positioned in a wetted region of a hull. The pods may be fastened inside hull correspondingly shaped receivers by screws or other fastening means.

Figure 10:
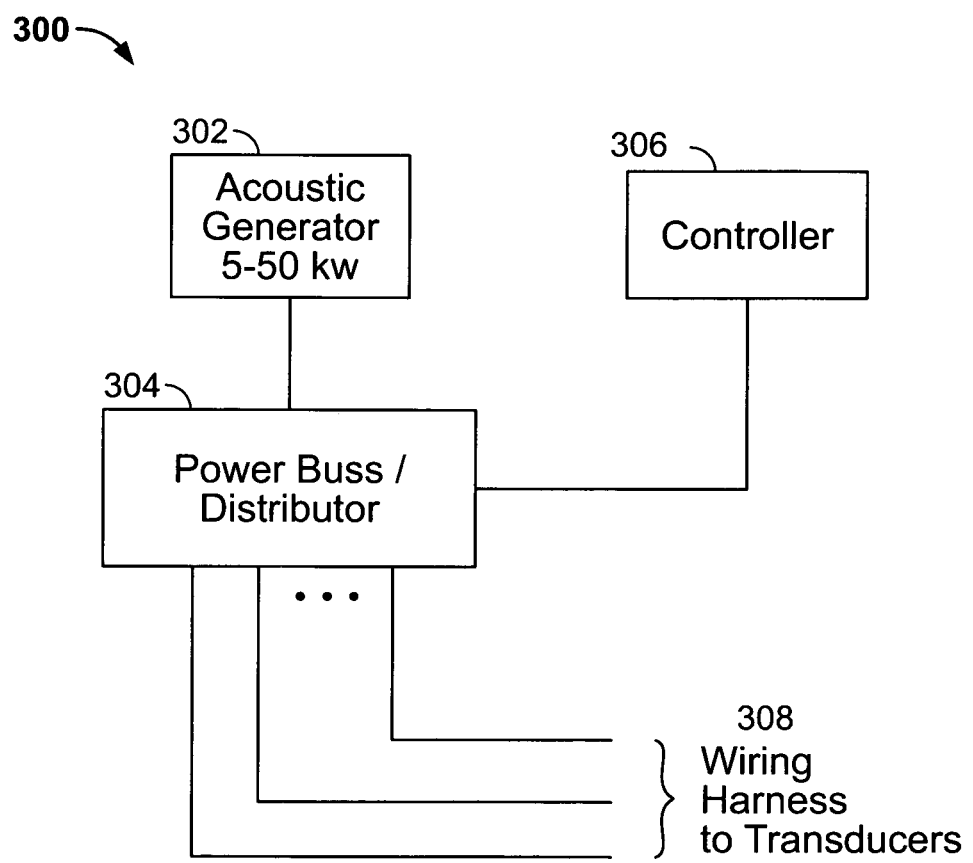
FIG. 10 shows an exemplary acoustic signal powering apparatus to generate and supply acoustic signals to the insonifying transducers of the vessel.

FIG. 10 shows an exemplary apparatus 300 to generate and supply acoustic signals to the insonifying transducers of the vessel, which comprises an acoustic generator 302 to produce acoustic power signal of the appropriate frequency or intensity, a power buss/distributor to convey acoustic power from the generator 302 to the respective transducers, a controller 306 to control the distribution or on-time of the acoustic energy to the transducers, and wiring harness 308 to carry the signals from the power distribution buss 304 to the respective transducers. In the exemplary embodiment, it is estimated that the generator has a capacity of five to fifty kilowatts (or more), depending on the size of the vessel and operating characteristics/desired performance. The distributor 304 may be implemented electronically with a series of high-power silicon control rectifier-pairs or bipolar power transistor arrangements having gates activated by the controller 306 to pass alternating current power, or may be implemented electronically by a programmable logic controller, or mechanically by a rotating electrical contacts, relays, or a commentator-like power distributor that is conventionally used in an electric motor or generator.

Figure 11A:
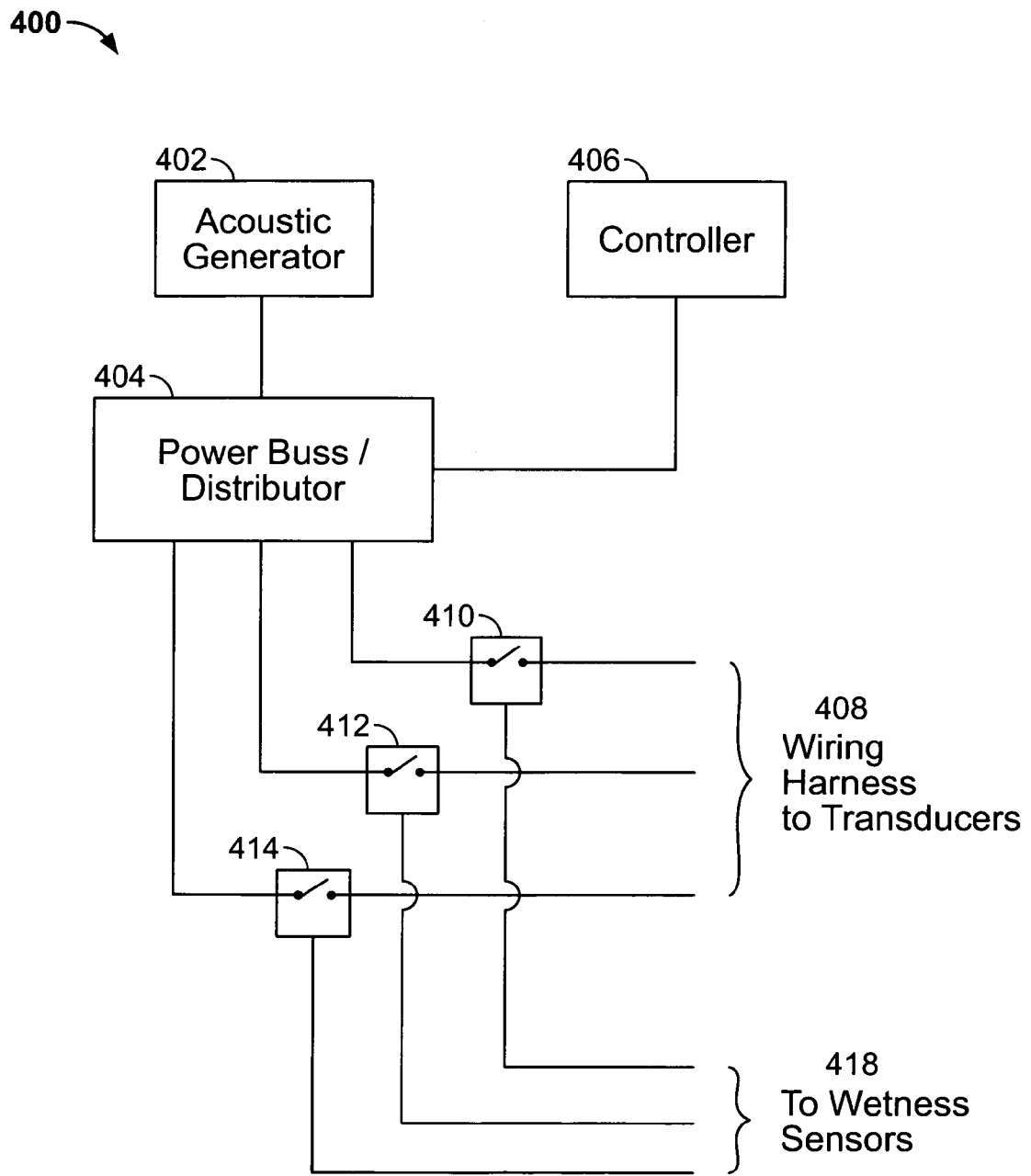
FIG. 11A shows an exemplary apparatus similar to the apparatus of FIG. 10 but additionally including a series of switches operative to cut or terminate power to transducer power signals supplied to respective transducers in response to a respective sensor signal received over respective sensor lines, which detect wetted areas between transducer sections.
Figure 11B:
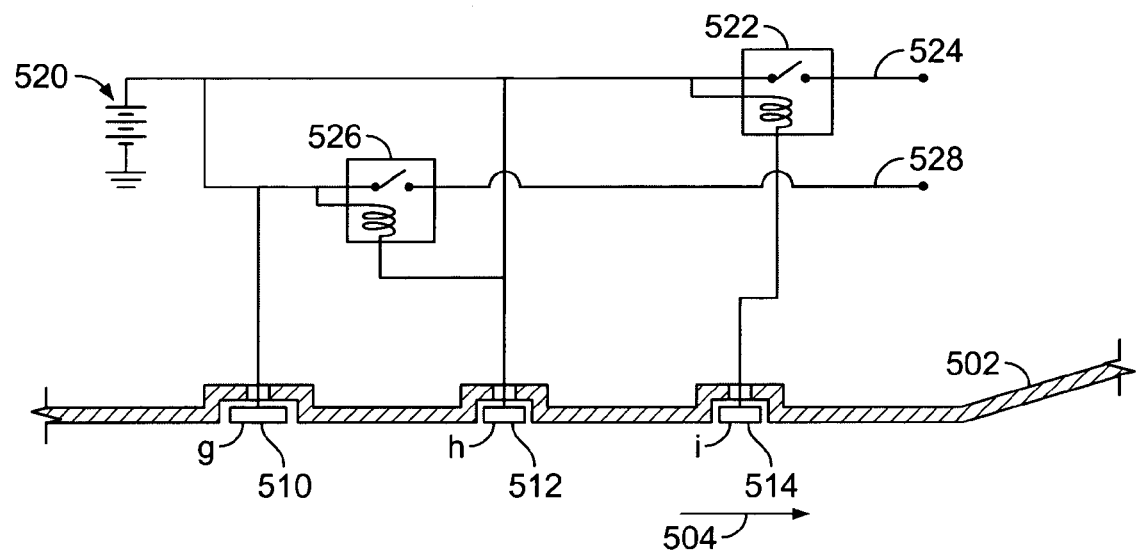
FIG. 11B shows an exemplary sensor circuit that may be employed with the apparatus of FIG. 11A to sense wetness in a wetted region of the hull having conductive transducer housings.

FIG. 11A shows an exemplary apparatus 400 similar to the apparatus 300 but additionally including a series of switches 410, 412, and 414 operative to cut power signals supplied to respective lines of harness 408 in response to a respective sensor signal received over respective sensor lines 418. As mentioned above, when the wetted area of the vessel changes due to momentary airborne flight over the water surface between surface waves or when encounter bow high waves, the power to transducers thereat may be dynamically and/or automatically controlled to apply or cut power. Due to seawater conductivity as a result of salinity (which makes it an electrolyte), the signal over sensor lines 418 may be generated by sensing short circuits between respective pairs of contiguous fore and aft insonifying transducer sections, as illustrated in FIG. 11B. Conductivity of lake, river, or brackish water may also trigger be used to provide on-off power control to the transducers. For example, referring to the hull insonifying sections of FIG. 7, and assuming switch 410 controls power to transducer section i, switch 410 is closed when an electrical short circuit is detected between stainless steel housings of insonifying sections h and i, and switch 410 is open when an open circuit is sensed between housings of insonifying sections h and i. A closed circuit indicates the presences of a wetted area between respective transducers, which open circuit indicates a dry or aerated region between respective transducers. Switches 410, 412, and 414 may comprise power transistors, SRC arrangements, relays, or the like to sense open and closed circuit conditions. For this purpose, a programmable logic controller may be programmed to receive sensor inputs (wetness sensors) and to control the various on-off switching of power to the transducer sections.

Figure 11C:
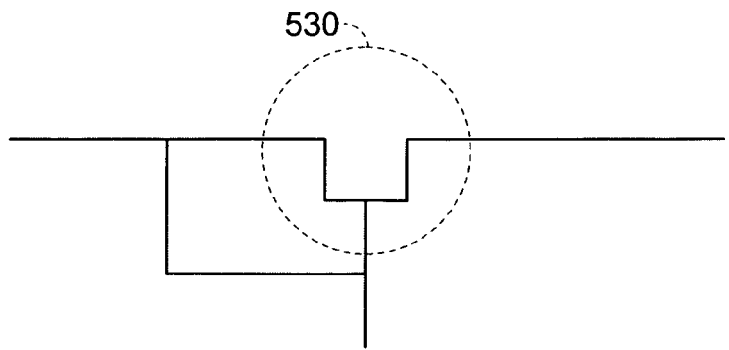
FIG. 11C shows a switching transistor that may be employed instead of a relay to activate and deactivate insonifying power to the transducers.

FIG. 11B illustrates a sensing arrangement that may be used with the circuit of FIG. 11A where a series of transducer housings g, h and i are positioned in hull 502 that proceeds through water in a direction indicated by arrow 504. When transducer housings 512 and 514 are wetted, a relay coil of switch 522 becomes energized by a closed electrical circuit between current source 520, housing 512, and housing 514. This closes switch 522 to produce an active signal on line 524, which connect to an appropriate on of sensor lines 418 of FIG. 11A in order to power the associated transducer with high-frequency acoustic energy. When transducer housings 510 and 512 are wetted, a relay coil of switch 526 becomes energized by a closed electrical circuit between current source 520, housing 510, and housing 512. This closes switch 526 to produce an active signal on line 528, which connect to an appropriate on of sensor lines 418 of FIG. 11A in order to power the associated transducer with high-frequency acoustic energy. This wetted area sensor arrangement may also be applied in the bow section to sense oncoming bow waves in order to activate acoustic signals applied to the bow transducers. Instead of relays, switching transistors, such as the transistor arrangement 530 shown in FIG. 11C, may be utilized. Moreover, instead of sensing open-closed circuit condition, a change in resistance or impedance may be sensed to indicate wetness of a hull region in which the transducers are positioned. Instead of electrical sensors, proximity sensors may be utilized. The type of sensor used in the acoustic energy control system may take on a variety of forms, including implementation of a microcomputer or programmable logic controller, without departing from the invention.

Even though the invention is described using the above illustrations, variations may come to those skilled in the art based on the teaching herein. Transducers may be piezoelectric or magneto restrictive, or even a mechanical vibrator. Instead of having spaced transducers or insonification sections, active ones of such transducers or sections may be spaced. Vessel types to which the invention is applicable include planing, semi-planing, or even displacement hull vessels. Control or regulatory systems to regulate or maintain acoustic signals may be manual, electro-mechanical, or electronic CPU control. Affixation of sonification plates to the hull may occur by bolting, adhesive bonding, or any type of interlocking means. Plates may be periodically replaced when fatigued due to cavitation damage. The surface of the diaphragm side of the sonification plates may be treated, roughened or pitted, or provided with raised and/or sunken contours (e.g., golf ball surface), to enhance microcavitation formation when co-acting with vortices due to vessel speed and/or acoustic waves. Spacing between transducer sections may vary according to other parameters than what is illustrated or described herein. Accordingly, the invention is not limited by what is shown or described, but instead, by the appended claims.

I claim:

1. A marine vessel that travels on a surface of a body of water, said vessel comprising:
   a hull having a wetted area when underway,
   a series of insonification sections positioned in said wetted area of said hull and contained within a sonification plate that is affixed against said hull,
   an acoustic generator to power said insonification sections to produce acoustic waves having an intensity sufficient to nucleate cavitation upon cavitation nuclei suspended in said water, and
   a wiring harness to distribute power from the acoustic generator to said series of insonification sections.

2. The marine vessel of claim 1, wherein said sonification plate is filled with foam or other a water blocking material to prevent wetting of insonifying devices or circuitry thereof.

3. The marine vessel of claim 1, wherein said insonification sections have a spacing in a fore-aft direction, and said spacing is determined according to vessel operating speed, nature of said acoustic waves, and/or conditions of the water in terms of cavitation nuclei and threshold or other condition.

4. The marine vessel of claim 1, wherein said acoustic generator produces a series of tone bursts of high-frequency acoustic energy to establish a pattern of cavitation that optimally reduces drag.

5. The marine vessel of claim 1, wherein said acoustic generator produces a tone burst of high-frequency acoustic energy having an initial high-frequency to initiate cavitation followed by a series of higher-frequency pulses to grow cavitation bubbles.

6. The marine vessel of claim 1, wherein said acoustic generator includes a common power supply to energize transducer pairs substantially equidistant from and positioned on opposite sides of a keel line of said hull in order to maintain symmetric drag reduction in the event of a failure of one of said transducers of said transducer pair.

7. The marine vessel of claim 1, wherein said acoustic generator is responsive to a wetted area sensor to activate a given one of said series of insonification sections.

8. The marine vessel of claim 1, wherein said hull is stepped, and said series of insonification sections are additionally provided in a wetted area fore of said step.

9. A marine vessel that travels on a surface of a body of water, said vessel comprising:
   a fiberglass hull having a wetted area when underway,
   a series of insonification sections embedded in said fiberglass and positioned in said wetted area of said hull,
   an acoustic generator to power said insonification sections to produce acoustic waves having an intensity sufficient to nucleate cavitation upon cavitation nuclei suspended in said water, and
   a wiring harness to distribute power from the acoustic generator to said series of insonification sections.

10. The marine vessel of claim 1, further including a controller to regulate at least one of intensity and duty cycle of said acoustic generator according to surface conditions of said water.

11. The marine vessel of claim 1, further including a controller to regulate at least one of intensity, frequency, and duty cycle of said acoustic generator according to speed of said vessel.

12. The marine vessel of claim 1, further including a controller to enable an operator to control at least one of intensity, frequency, and duty cycle of said acoustic generator.

13. The marine vessel of claim 1, further including a controller to intermittently or alternately supply power to respective insonification sections whereby to enable greater portion of available acoustic power to be instantaneously supplied to a given insonification section.

14. The marine vessel of claim 1, further including a wetness sensor to activate a given insonification section in response to a wetted condition thereof whereby to conserve power when portions of said hull become aerated during high-speed planing.

15. The marine vessel of claim 1, wherein said hull comprising a planing hull having a reduced wetted area while on plane, and said series of acoustic transducers are positioned against said hull in said reduced wetted area.

16. The marine vessel of claim 1, wherein the acoustic generator produces an ultrasonic tone burst signal that imparts to said water an acoustic wave having a momentary intensity between 0.5 and 1000 watts per square centimeter.

17. A method of reducing skin friction drag of a marine hull while underway in surface contact with a water body, said method comprising:

providing insonifying transducers at a wetted region of said hull, energizing said transducers to produce acoustic waves having an intensity above a predetermined cavitation threshold that at least exceeds a tensile strength of said water medium to nucleate cavitation on cavitation nuclei suspended in said medium whereby to populate microcavities therein, and during movement of said medium pass said insonifying transducers, exposing populated microcavities to tone bursts of acoustic waves having an intensity and frequency between eighteen and two hundred kilohertz in accordance with conditions of said water medium in order to grow said populated microcavities to a desired number, density, and/or size to achieve a desired drag reduction.

18. The method of claim 17, wherein a target size of said microcavities produced in said exposing step ranges between fifty and two hundred microns.

19. The method of claim 17, wherein said exposing step includes regulating a duty cycle of said tone bursts to provide a pattern of cavitation that achieves said desired drag reduction.

20. The method of claim 19, further including regulating the intensity and/or said duty cycle according to speed of said hull in relation to said water medium.

21. The method of claim 20, further including regulating both said intensity and duty cycle wherein the acoustic intensity ranges between 0.5 to 1000 watts per square centimeter and said duty cycle inversely ranges between 100% and 0.1%.

22. The method of claim 17, further including providing a distributor/controller to distribute tone bursts of acoustic signals among multiple insonifying transducers affixed about said hull in order to produce microcavitation bubbles about a wetted area of said hull.

23. The method of claim 22, further including alternately or periodically distributing tone bursts of acoustic signal among said insonifying transducers.

24. The method of claim 19, further comprising dynamically determining said cavitation threshold while said hull is underway and adjusting the intensity according to said dynamically determined threshold.

25. The method of claim 17, wherein said providing step includes providing said transducers inside a water-tight sonification plate having a diaphragm side and a abutment side, and mounting the abutment side of said sonification plate against a wetted region of said hull.

26. A marine vessel that travels on a surface of a body of water, said vessel comprising:

a hull having a wetted area when underway on said surface of said body of water, a series of spaced transducer sections positioned about said wetted area, and an acoustic generator to energize said transducers to produce acoustic waves having an intensity determined according to conditions of said water that is sufficient to nucleate cavitation upon cavitation nuclei suspended in said water wherein the acoustic generator produces an ultrasonic tone burst signal that imparts to said water an acoustic wave having a momentary intensity between 0.5 and 1000 watts per square centimeter.

27. The vessel of claim 26, wherein the intensity and a frequency of said acoustic generator is determined to produce acoustic waves to achieve a target size of microcavitation bubbles that includes a size between fifty and two hundred microns.

28. The vessel of claim 26, wherein spacing between said transducer sections in a fore-aft direction is determined according to at least one of vessel operating speed, nature of said acoustic waves, and conditions of the water.

29. The vessel of claim 26, further including a controller to regulate intensity and/or duty cycle of said acoustic waves according to vessel speed.

* * * * *